US009601893B2

(12) United States Patent
Kakizaki et al.

(10) Patent No.: US 9,601,893 B2
(45) Date of Patent: Mar. 21, 2017

(54) LASER APPARATUS

(71) Applicant: GIGAPHOTON INC., Tochigi (JP)

(72) Inventors: Kouji Kakizaki, Tochigi (JP); Takeshi Asayama, Tochigi (JP); Osamu Wakabayashi, Tochigi (JP)

(73) Assignee: GIGAPHOTON INC., Tochigi (JP)

(*) Notice: Subject to any disclaimer, the term of this patent is extended or adjusted under 35 U.S.C. 154(b) by 0 days.

(21) Appl. No.: 15/060,148

(22) Filed: Mar. 3, 2016

(65) Prior Publication Data

US 2016/0190763 A1 Jun. 30, 2016

Related U.S. Application Data

(63) Continuation of application No. PCT/JP2013/076854, filed on Oct. 2, 2013.

(51) Int. Cl.
*H01S 3/038* (2006.01)
*H01S 3/134* (2006.01)
*H01S 3/225* (2006.01)
*H01S 3/08* (2006.01)

(52) U.S. Cl.
CPC .............. *H01S 3/038* (2013.01); *H01S 3/134* (2013.01); *H01S 3/225* (2013.01); *H01S 3/08009* (2013.01)

(58) Field of Classification Search
CPC ........... H01S 3/038; H01S 3/225; H01S 3/134
See application file for complete search history.

(56) References Cited

U.S. PATENT DOCUMENTS

| 4,217,560 A | 8/1980 | Kosyrev et al. |
| 7,856,044 B2 | 12/2010 | Sandstrom et al. |
| 2008/0179297 A1* | 7/2008 | Bailey ............... H01J 37/32366 219/69.15 |
| 2016/0129780 A1* | 5/2016 | McAlister ............ B60K 15/035 220/62.11 |

FOREIGN PATENT DOCUMENTS

| JP | S54-896 A | 1/1979 |
| JP | S61-128583 A | 6/1986 |
| JP | S63-229789 A | 9/1988 |
| JP | H01-118467 U | 8/1989 |
| JP | H06-029592 A | 2/1994 |
| JP | H07-142795 A | 6/1995 |
| JP | H11-087825 A | 3/1999 |
| JP | 2010-525571 A | 7/2010 |

OTHER PUBLICATIONS

International Search Report issued in PCT/JP2013/076854; mailed Jan. 7, 2014.

* cited by examiner

*Primary Examiner* — Dung Nguyen
(74) *Attorney, Agent, or Firm* — Studebaker & Brackett PC

(57) ABSTRACT

There may be provided a laser apparatus including: an optical resonator including an output coupler; a laser chamber containing a laser medium and disposed in an optical path inside the optical resonator; a pair of discharge electrodes disposed inside the laser chamber; an electrode gap varying section configured to vary a gap between the discharge electrodes; a laser beam measurement section disposed in an optical path of a laser beam outputted from the output coupler, the laser beam resulting from electric discharge between the discharge electrodes; and a controller configured to control the gap between the discharge electrodes through activating the electrode gap varying section, based on a beam parameter of the laser beam measured by the laser beam measurement section.

7 Claims, 28 Drawing Sheets

| No | RANGE OF PULSE ENERGY E (mJ) | ELECTRODE GAP G | CHARGING VOLTAGE Vhv |
|---|---|---|---|
| 1 | $E < 10$ | Ga | Vhva |
| 2 | $10 \leq E < 15$ | Gb | Vhvb |
| 3 | $15 \leq E < 20$ | Gc | Vhvc |
| 4 | $20 \leq E$ | Gd | Vhvd |

$Ga < Gb < Gc < Gd$
$Vhva \leq Vhvb \leq Vhvc \leq Vhvd$

FIG. 17

LASER APPARATUS

CROSS REFERENCE TO RELATED APPLICATIONS

This is a continuation of International Application No. PCT/JP2013/076854, filed Oct. 2, 2013, the entire contents of which are incorporated herein by reference.

BACKGROUND

The disclosure relates to a laser apparatus.

With miniaturization and high integration of a semiconductor integrated circuit, improvement of resolution is demanded in a semiconductor exposure apparatus. Hereinafter, the semiconductor exposure apparatus is simply referred to as "exposure apparatus". Shortening of a wavelength of light outputted from an exposure light source is accordingly proceeding. A gas laser apparatus is used for the exposure light source, in place of an existing mercury lamp. Currently, as a gas laser apparatus for exposure, a KrF excimer laser apparatus that outputs ultraviolet rays of a wavelength of 248 nm and an ArF excimer laser apparatus that outputs ultraviolet rays of a wavelength of 193 nm are used.

As current exposure technology, liquid immersion exposure is practically used in which a clearance between a projection lens on exposure apparatus side and a wafer is filled with a liquid to change a refractive index of the clearance, shortening an apparent wavelength of light from the exposure light source. When the liquid immersion exposure is performed with use of the ArF excimer laser apparatus as the exposure light source, ultraviolet rays with a wavelength of 134 nm in water are applied to the wafer. This technology is referred to as ArF liquid immersion exposure. The ArF liquid immersion exposure is also referred to as ArF liquid immersion lithography.

A spectral line width in free oscillation of the KrF and ArF excimer laser apparatus is wide and about 350 pm to about 400 pm. Thus, when the projection lens of any of these laser apparatuses is used, color aberration of a laser beam occurs. This may result in degradation in resolution. It is therefore necessary to narrow the spectral line width (spectrum width) of the laser beam outputted from the gas laser apparatus to an extent that the color aberration is negligible. A line narrowing module including a line narrowing device (such as an etalon and a grating) is thus provided inside a laser resonator of the gas laser apparatus, which achieves narrowing of the spectrum width. The laser apparatus in which the spectrum width is narrowed in this way is referred to as a line narrowing laser apparatus. For example, reference is made Japanese Unexamined Patent Application Publication No. H6-29592, Japanese Unexamined Patent Application Publication No. S63-229789, and U.S. Pat. No. 7,856,044.

SUMMARY

A laser apparatus according to an embodiment of the disclosure may include: an optical resonator including an output coupler; a laser chamber containing a laser medium and disposed in an optical path inside the optical resonator; a pair of discharge electrodes disposed inside the laser chamber; an electrode gap varying section configured to vary a gap between the discharge electrodes; a laser beam measurement section disposed in an optical path of a laser beam outputted from the output coupler, the laser beam resulting from electric discharge between the discharge electrodes; and a controller configured to control the gap between the discharge electrodes through activating the electrode gap varying section, based on a beam parameter of the laser beam measured by the laser beam measurement section.

A laser apparatus according to another embodiment of the disclosure may include: an optical resonator including an output coupler; a laser chamber containing a laser medium and disposed in an optical path inside the optical resonator; a pair of discharge electrodes disposed inside the laser chamber; an electrode gap varying section configured to vary a gap between the discharge electrodes; a pulse energy measurement section disposed in an optical path of a laser beam outputted from the output coupler, the laser beam resulting from electric discharge between the discharge electrodes; and a controller configured to control the gap between the discharge electrodes through activating the electrode gap varying section, based on a value measured by the pulse energy measurement section.

A laser apparatus according to another embodiment of the disclosure may include: an optical resonator including an output coupler; a laser chamber containing a laser medium and disposed in an optical path inside the optical resonator; a pair of discharge electrodes disposed inside the laser chamber; an electrode gap varying section configured to vary a gap between the discharge electrodes; and a controller configured to control the gap between the discharge electrodes through activating the electrode gap varying section to allow a frequency of a pulsed laser beam outputted from the output coupler to be a predetermined frequency, the pulsed laser beam resulting from electric discharge between the discharge electrodes.

BRIEF DESCRIPTION OF THE DRAWINGS

Some embodiments of the disclosure are described below as mere examples with reference to the accompanying drawings.

FIG. 17 is a diagram illustrating relationship between the pulse energy and both of an electrode gap and the charging voltage.

DETAILED DESCRIPTION

Figure 1:
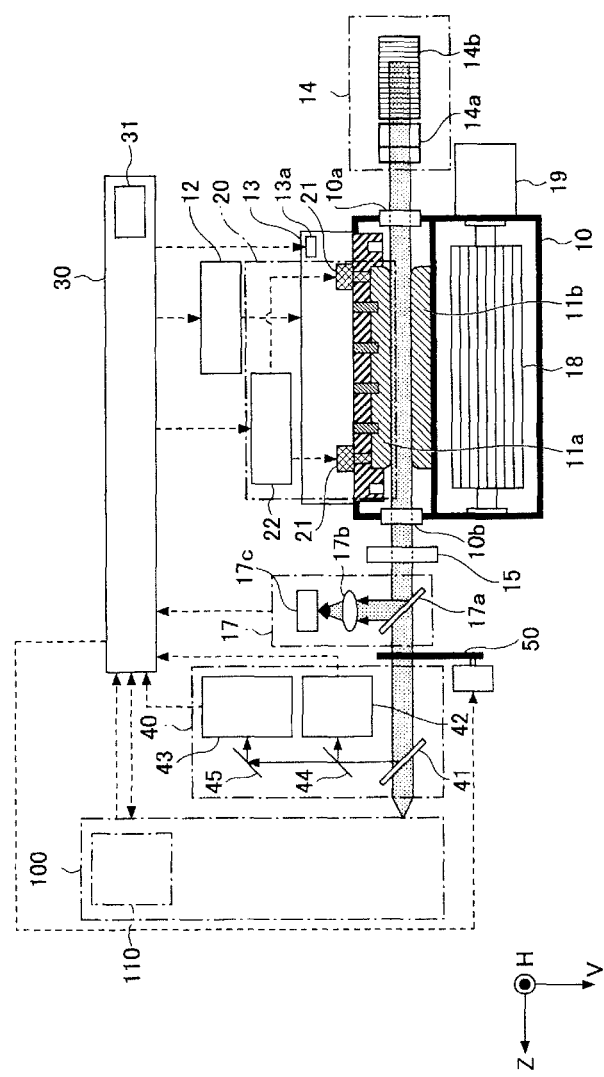
FIG. 1 is a schematic configuration diagram of an illustrative laser apparatus according to an embodiment of the disclosure.

In the following, some embodiments of the disclosure are described in detail with reference to the drawings. Embodiments described below each illustrate one example of the disclosure and are not intended to limit the contents of the disclosure. Also, all of the configurations and operations described in each embodiment are not necessarily essential for the configurations and operations of the disclosure. Note that the like elements are denoted with the same reference numerals, and any redundant description thereof is omitted.

Contents
1. Description of terms
2. Laser apparatus
    2.1 Issues
    2.2 Configuration
    2.3 Operation
    2.4 Action
    2.5 Electrode gap varying section
    2.6 Connector
    2.7 Another embodiment of electrode moving mechanism
3. Beam parameter control by electrode gap varying section
    3.1 Configuration
    3.2 Operation
    3.3 Action
    3.4 Others
    3.5 Method of controlling beam parameter by electrode gap varying section
        3.5.1 Method of controlling beam size
        3.5.2 Method of controlling beam divergence
4. Pulse energy control by electrode gap varying section
    4.1 Configuration
    4.2 Operation
    4.3 Action
    4.4 Method of controlling pulse energy by electrode gap varying section
5. Frequency control of pulsed laser light by electrode gap varying section
    5.1 Configuration and operation
    5.2 Relationship between electrode gap G and frequency f
    5.3 Method of controlling frequency of pulsed laser light by electrode gap varying section
6. Electrode gap adjustment in double chamber excimer laser apparatus
    6.1 Configuration
    6.2 Beam parameter control
        6.2.1 Operation
        6.2.2 Action
    6.3 Pulse energy control
        6.3.1 Operation
        6.3.2 Action
7. Others
    7.1 Modification of electrode gap varying section
    7.2 Power supply circuit of excimer laser light source
    7.3 Controller

[1. Description of Terms]

Terms used in some embodiments of the disclosure are defined as follows. "Optical path" is a path through which laser beam passes. The optical path may be an axis passing through a substantial center of a sectional surface of laser beam along a traveling direction of the laser beam.

[2. Laser Apparatus]

[2.1 Issues]

A discharge excitation gas laser apparatus for a semiconductor exposure apparatus includes a pair of discharge electrodes provided in a chamber containing laser gas, and applies a high voltage to the pair of discharge electrodes to excite the laser gas by electric discharge, thereby causing laser oscillation.

When the laser apparatus is used, however, a pulsed laser beam to be outputted may be varied in a beam parameter such as a beam size and beam divergence. In this case, easy adjustment is desired in order to obtain a desired beam parameter. Further, pulse energy of the pulsed laser beam is desired to be varied in a short time.

[2.2 Configuration]

FIG. 1 illustrates an excimer laser apparatus according to an embodiment of the disclosure. Note that, in some embodiments of the disclosure, "excimer laser apparatus" may be simply referred to as "laser apparatus".

The laser apparatus according to the embodiment of the disclosure may be a discharge excitation gas laser apparatus. The laser apparatus according to the embodiment of the disclosure may include, for example, a laser chamber 10, a laser resonator, a charger 12, a pulse power module (PPM) 13, a pulse energy measurement section 17, a laser controller 30, and a laser beam measurement section 40. The laser controller 30 may include a memory 31.

The laser chamber 10 may include a pair of discharge electrodes 11a and 11b, two windows 10a and 10b, an electrode gap varying section 20, a cross flow fan 18, and a motor 19 rotating the cross flow fan 18. The two windows 10a and 10b allow light from the laser resonator to pass therethrough. The laser chamber 10 may contain excimer laser gas serving as a laser medium. Note that, in some embodiments of the disclosure, the discharge electrodes 11a and 11b may also be referred to as a first discharge electrode 11a and a second discharge electrode 11b, respectively.

The laser chamber 10 may be disposed in an optical path of the laser resonator. The laser resonator may include an output coupler (OC) 15 and a line narrowing module (LMN) 14. The line narrowing module 14 may include a prism 14a and a grating 14b that expand the laser beam. The grating 14b may be disposed in Littrow arrangement in which an incident angle is equal to a diffraction angle.

The output coupler 15 may be a partial reflection mirror that reflects a part of the entered pulsed laser beam and allows the other part of the entered pulsed laser beam to pass therethrough.

The pulse energy measurement section 17 may include, for example, a beam splitter 17a, a light condensing lens 17b, and a light sensor 17c. The beam splitter 17a may be disposed in an optical path of the pulsed laser beam outputted from the output coupler 15.

The pulse power module 13 may include an unillustrated charging capacitor, be coupled to the first discharge electrode 11a, and further include a switch 13a that causes electric discharge between the discharge electrodes 11a and 11b. The charger 12 may be coupled to the unillustrated charging capacitor in the pulse power module 13.

The laser gas serving as a laser medium in the laser chamber 10 may contain, for example, Ar or Kr as rare gas, $F_2$ gas as halogen gas, Ne or He as buffer gas, or mixed gas thereof.

An unillustrated heat exchanger may be provided inside the laser chamber 10.

The electrode gap varying section 20 may include a plurality of electrode moving mechanisms 21 and a driver 22. The electrode moving mechanisms 21 may vary a gap between the discharge electrodes 11a and 11b. The driver 22 may drive the electrode moving mechanisms 21. Each of the electrode moving mechanisms 21 may be configured of, for example, an actuator, and two or three or more electrode moving mechanisms 21 may be provided.

The laser beam measurement section 40 may include a beam splitter 41, a beam profile meter 42, a beam divergence meter 43, a beam splitter 44, and a mirror 45. The beam splitter 41 may be disposed in an optical path of the pulsed laser light that has been outputted from the output coupler 15 and then has passed through the beam splitter 17a.

An openable and closable emission port shutter 50 may be provided in an optical path of the pulsed laser beam between the pulse energy measurement section 17 and the laser beam measurement section 40.

[2.3 Operation]

The laser controller 30 may receive, from an exposure apparatus controller 110 of an exposure apparatus 100, a target beam parameter Bt (such as a target beam size and target beam divergence) and a tolerance ΔBmax of a difference between the beam parameter and the target beam parameter Bt. When the beam parameter is not varied, these data may be stored in the memory 31 of the laser controller 30 in advance, and these data may be read as necessary.

A predetermined charging voltage (Vhv) may be set to the charger 12 under the control of the laser controller 30. The switch 13a in the pulse power module 13 may be operated in synchronization with an oscillation trigger from an unillustrated trigger generator in the charger 12, to apply a high voltage between the discharge electrodes 11a and 11b.

This may cause electric discharge between the discharge electrodes 11a and 11b to excite the laser gas, which may result in laser oscillation in the laser resonator that is formed by the output coupler 15 and the grating 14b of the line narrowing module 14. At this time, a pulsed laser beam, the spectral line width of which has been narrowed by the prism 14a and the grating 14b of the line narrowing module 14, may be outputted from the output coupler 15.

A part of the pulsed laser beam that has been outputted from the output coupler 15 may enter the pulse energy measurement section 17. A part of the entered pulsed laser beam may be reflected by the beam splitter 17a, and the other part of the entered pulsed laser beam may pass through the beam splitter 17a. The pulsed laser beam that has been reflected by the beam splitter 17a may be condensed by the light condensing lens 17b, and the condensed pulsed laser beam may then enter the light sensor 17c. The light sensor 17c may detect pulse energy of the reflected and condensed pulsed laser beam. The pulsed laser beam that has passed through the beam splitter 17a may enter the laser beam measurement section 40.

A part of the pulsed laser beam that has entered the laser beam measurement section 40 may be reflected by the beam splitter 41 of the laser beam measurement section 40, and the other part thereof may pass through the beam splitter 41. The pulsed laser beam that has been reflected by the beam splitter 41 may enter the beam splitter 44. A part of the pulsed laser beam that has entered the beam splitter 44 may be reflected by the beam splitter 44, and the other part thereof may pass through the beam splitter 44. The pulsed laser beam that has been reflected by the beam splitter 44 may enter the beam profile meter 42. The pulsed laser beam that has passed through the beam splitter 44 may be reflected by the mirror 45, and the pulsed laser beam that have been reflected by the mirror 45 may then enter the beam divergence meter 43. The pulsed laser beam that has passed through the beam splitter 41 may enter the exposure apparatus 100.

A beam parameter (such as a beam size and beam divergence) of the pulsed laser beam may be measured by the laser beam measurement section 40.

The laser controller 30 may calculate a difference ΔB (=B−Bt) between the target beam parameter Bt and the measured beam parameter B, and transmit, to the driver 22 of the electrode gap varying section 20, a control signal that brings the difference ΔB close to zero. As described later, in the electrode gap varying section 20, the driver 22 may move the plurality of electrode moving mechanisms 21 to move the first discharge electrode 11a, thereby adjusting the gap between the discharge electrodes 11a and 11b.

Thereafter, the laser controller 30 may measure the beam parameter B (such as the beam size and the beam divergence) again with use of the laser beam measurement section 40.

The laser controller 30 may determine whether or not an absolute value |ΔB| of the difference between the target beam parameter Bt and the measured beam parameter B is equal to or smaller than the tolerance ΔBmax. When determining that the absolute value |ΔB| of the difference is equal to or smaller than the tolerance ΔBmax, the laser controller 30 may inform the exposure apparatus 100 of completion of the electrode gap control. When determining that the absolute value |ΔB| of the difference exceeds the tolerance ΔBmax, the laser controller 30 may further perform the electrode gap control.

Note that the pulsed laser beam may be outputted at a predetermined frequency.

[2.4 Action]

Since the laser apparatus according to the embodiment of the disclosure performs feedback control on the electrode gap varying section 20 based on the beam parameter B measured by the laser beam measurement section 40, it is possible to adjust the beam parameter B to the desired target beam parameter Bt.

Note that the laser apparatus is not limited to the line narrowing laser apparatus, and may be a laser apparatus outputting natural oscillation light. For example, a high-reflection mirror may be disposed in place of the line narrowing module 14.

[2.5 Electrode Gap Varying Section]

Figure 2A:
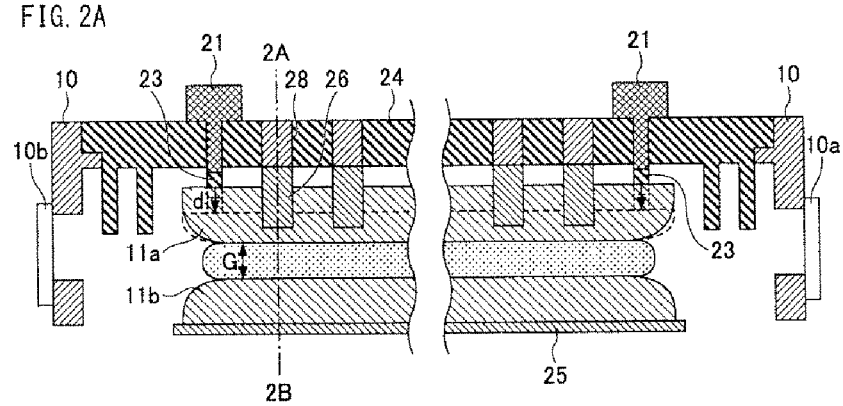
FIG. 2A is a configuration diagram of an electrode gap varying section provided on a laser chamber.
Figure 2B:
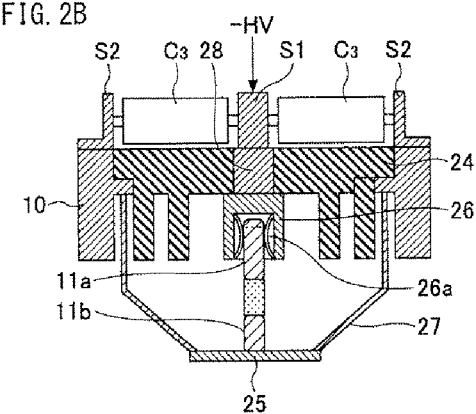
FIG. 2B is a sectional diagram of the electrode gap varying section provided on the laser chamber.

The laser chamber 10 and the electrode gap varying section 20 in the laser apparatus according to the embodiment of the disclosure are described with reference to FIGS. 2A and 2B. Note that FIG. 2A is a sectional diagram illustrating a main part of the laser chamber 10, and FIG. 2B is a sectional diagram illustrating the laser chamber 10 cut along an alternate long and short dash line 2A-2B in FIG. 2A. Note that FIG. 2B is a sectional diagram in a case where a plurality of capacitors $C_3$ of the pulse power module 13 are provided in two lines along an extending direction of the discharge electrode 11a. One end of each of the capacitor $C_3$ may be coupled to a coupling electrode S1 coupled to a current induction terminal 28, and the other end of each of the capacitor $C_3$ may be coupled to a coupling electrode S2 that is grounded.

The laser apparatus according to the embodiment of the disclosure may include a connector 26 provided at a front end of the current induction terminal 28, and the current induction terminal 28 may be electrically coupled to the first discharge electrode 11 through the connector 26. Also, the connector 26 may support the first discharge electrode 11a in such a manner that the first discharge electrode 11a is movable toward side where the second discharge electrode 11b is provided. The connector 26 may maintain electric coupling between the current induction terminal 28 and the first discharge electrode 11a even when the first discharge electrode 11a moves toward the side where the second discharge electrode 11b is provided within a predetermined range.

The second discharge electrode 11b may be disposed on an electrode holder 25. The electrode holder 25 may be grounded by being coupled to a metal part of the laser chamber 10 through a wiring 27. The second discharge electrode 11b may be accordingly grounded.

Two electrode moving mechanisms 21 may be provided in an electric insulator 24. An insulating member 23 may be provided between each of the electrode moving mechanisms 21 and the first discharge electrode 11a. One of the two electrode moving mechanisms 21 may be provided at a position corresponding to the vicinity of one end of the first discharge electrode 11a in a longitudinal direction. The other electrode moving mechanism 21 may be provided at a position corresponding to the vicinity of the other end of the first discharge electrode 11a in the longitudinal direction.

Each of the electrode moving mechanisms 21 may move, through the insulating member 23, the first discharge electrode 11a toward the side where the second discharge electrode 11b is provided. This may adjust a gap between the first discharge electrode 11a and the second discharge electrode 11b, namely, a length of the electrode gap G. Note that, when the electrode moving mechanism 21 is partially or entirely formed of an insulating material, the insulating member 23 may be omitted in some cases.

When the electric discharge between the first discharge electrode 11a and the second discharge electrode 11b may be repeated, for example, the surface, of the first discharge electrode 11a, facing the second discharge electrode 11b may be accordingly shaved. Thus, the gap between the first discharge electrode 11a and the second discharge electrode 11b may become larger than the gap in the initial state.

When the gap between the first discharge electrode 11a and the second discharge electrode 11b becomes larger than a predetermined gap, the beam parameter B may be varied. The laser controller 30 may measure the variation of the beam parameter B with use of the laser beam measurement section 40, and drive the two electrode moving mechanisms 21 by the driver 22 to allow the beam parameter B to be within the predetermined range. Driving the two electrode moving mechanisms 21 may move the first discharge electrode 11a toward the side where the second discharge electrode 11b is provided, by a movement Δd. The movement Δd may be substantially equal to the length of the shaved part of the first discharge electrode 11a. Moving the shaved first discharge electrode 11a may adjust the gap between the first discharge electrode 11a and the second discharge electrode 11b to the predetermined gap. For example, the gap between the first discharge electrode 11a and the second discharge electrode 11b may be adjusted to be substantially equal to the gap in the initial state.

In the laser apparatus according to the embodiment of the disclosure, the first discharge electrode 11a may be pushed by the electrode moving mechanisms 21 through the respective insulating members 23. Therefore, the electrode moving mechanisms 21 may be electrically insulated from the first discharge electrode 11a by the respective insulating members 23. Even when the first discharge electrode 11a moves toward the second discharge electrode 11b within the predetermined range, the electrical coupling between the current induction terminal 28 and the first discharge electrode 11a may be maintained by the connector 26. This may make it possible to cause electric discharge between the first discharge electrode 11a and the second discharge electrode 11b.

[2.6 Connector]

Figure 3A:
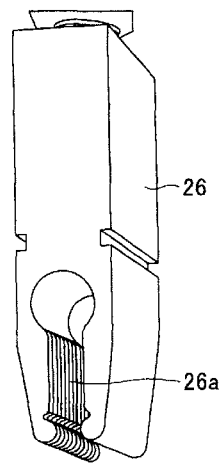
FIG. 3A is a configuration diagram of a connector used in the electrode gap varying section.
Figure 3B:
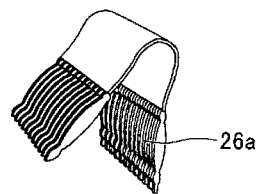
FIG. 3B is a perspective view of a part of the connector used in the electrode gap varying section.

The connector 26 that comes into contact with the first discharge electrode 11a may be a fork-shaped connector as illustrated in FIG. 3A. The fork-shaped may refer to, for example, a branched configuration. The fork-shaped connector may include a leaf spring 26a in which a part coming into contact with the first discharge electrode 11a is formed in a fork shape. More specifically, the leaf spring 26a that is an elastic member illustrated in FIG. 3B may be fitted as a separately-formed member in the fork-shaped connector serving as the connector 26 illustrated in FIG. 3A. The leaf spring 26a may be formed of an elastic metal material. Note that FIG. 3A is a perspective view illustrating the fork-shaped connector serving as the connector 26, and FIG. 3B is a perspective view illustrating the leaf spring 26a in the fork-shaped connector serving as the connector 26.

Since the first discharge electrode 11a is held by the fork-shaped connector serving as the connector 26, the first discharge electrode 11a may stretch in the longitudinal direction by sliding on the part contacted with the leaf spring 26a even when the temperature of the first discharge electrode 11a is increased and thermal expansion of the first discharge electrode 11a accordingly occurs. This may prevent the first discharge electrode 11a from being bent by stress or any other factor. Further, since the first discharge electrode 11a may stretch by sliding on the part contacted with the leaf spring 26a, it may be possible to prevent the insulating member 23 from being damaged by force applied between the first discharge electrode 11a and the electrode moving mechanisms 21 resulting from the thermal expansion of the first discharge electrode 11a.

The leaf spring 26a that configures the fork-shaped connector serving as the connector 26 may be formed of an alloy of beryllium (Be) and copper (Cu) or brass. The surface of the leaf spring 26a may be plated by nickel (Ni). The laser gas in the laser chamber 10 contains fluorine ($F_2$) gas. Thus, nickel plating that is corrosion-resistant to the fluorine gas may be performed on the surface of the leaf spring 26a to enhance corrosion resistance of the leaf spring 26a to the fluorine gas.

[2.7 Other Embodiments of Electrode Moving Mechanism]

Figure 4:
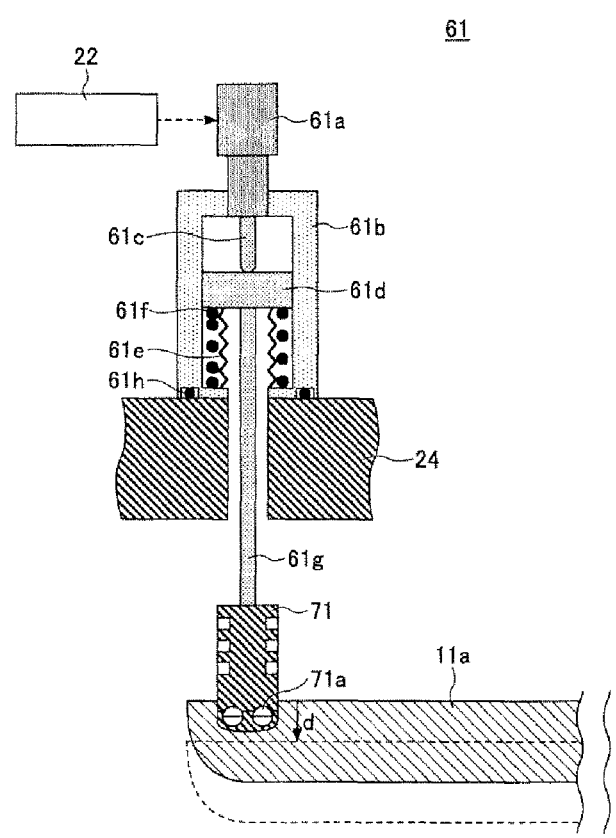
FIG. 4 is a configuration diagram of an electrode moving mechanism according to another embodiment of the disclosure.

The electrode moving mechanism moving the first discharge electrode 11a may be an electrode moving mechanism 61 using a micrometer head 61a as illustrated in FIG. 4. More specifically, the electrode moving mechanism 61 may include, for example, the micrometer head 61a, a cylinder 61b, a spindle 61c, a piston 61d, a bellows 61e, a spring 61f, and a shaft 61g. The cylinder 61b may be coupled to the electric insulator 24 through an O-ring 61h. The piston 61d may be provided inside the cylinder 61b, and the bellows 61e and the spring 61f may be provided on the electric insulator 24 side of the piston 61d. The electric insulator 24 side of the piston 61d may be coupled to one end of the shaft 61g, and the other end of the shaft 61g may be coupled to an electric insulating member 71. The electric insulating member 71 may be fixed to the first discharge electrode 11a by a screw 71a.

The micrometer head 61a may be driven under the control of the laser controller 30 through the driver 22. Driving the micrometer head 61a may push the piston 61d in the cylinder 61b through the spindle 61c. The piston 61d may accordingly push the first discharge electrode 11a through the shaft 61g and the electric insulating member 71. The bellows 61e may be provided on side of the piston 61d coupled to the shaft 61g, and the bellows 61e may isolate the inside of the laser chamber 10 from the outside.

Accordingly, the electrode moving mechanism 61 may move the first discharge electrode 11a toward the second discharge electrode 11b by the micrometer head 61a through the shaft 61g while preventing leakage of the laser gas in the laser chamber 10 by the bellows 61e. This makes it possible to decrease the gap G between the first discharge electrode 11a and the second discharge electrode 11b.

The first discharge electrode 11a may be electrically insulated from the shaft 61g by the electric insulating member 71. Since the electric insulating member 71 is fixed and coupled to the first discharge electrode 11b by the screw 71a, the first discharge electrode 11a may be moved up and down in the electric discharge direction.

Note that, if the first discharge electrode 11a is excessively close to the second discharge electrode 11b by the micrometer head 61a, the micrometer head 61a may be returned to raise the shaft 61g by the force of the spring 61f. This may make it possible to adjust the gap G between the first discharge electrode 11a and the second discharge electrode 11b to the desired gap.

[3. Beam Parameter Control by Electrode Gap Varying Section]

[3.1 Configuration]

Figure 5:
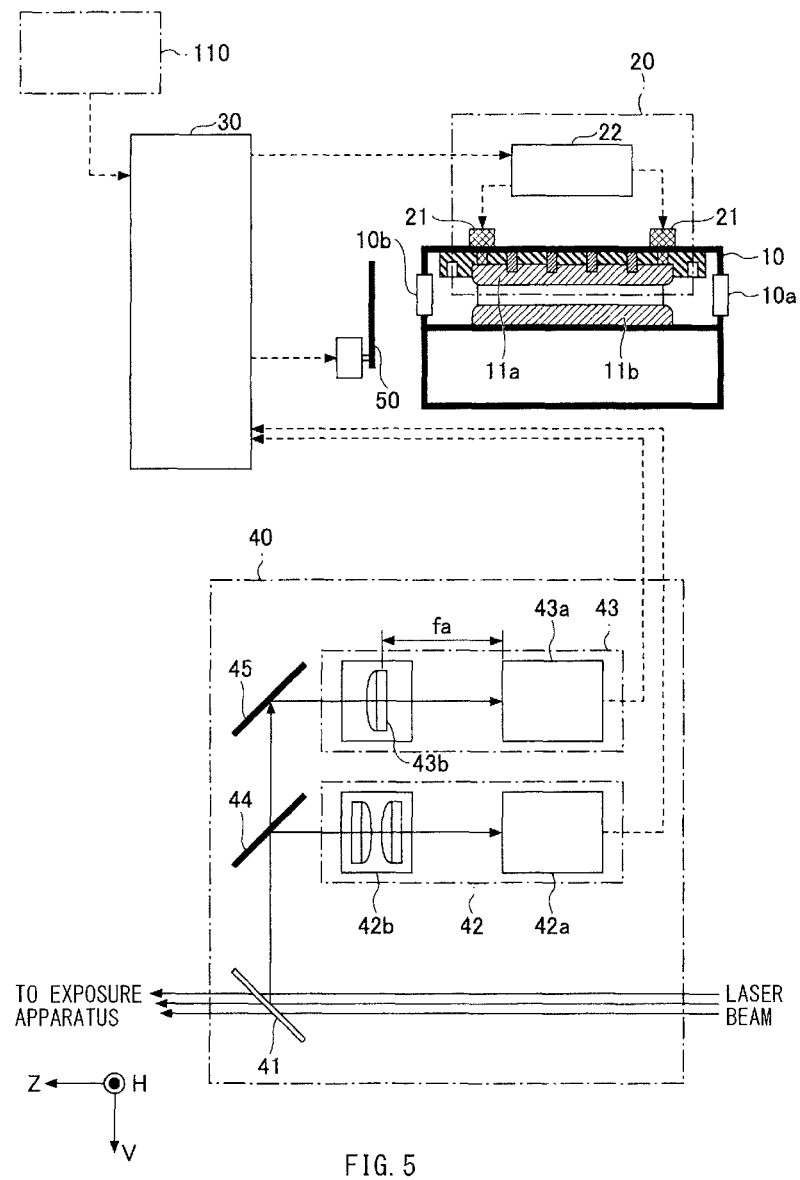
FIG. 5 is an explanatory diagram of beam parameter control by the electrode gap varying section.

A part used to control the beam parameter of the pulsed laser beam in the laser apparatus is described with reference to FIG. 5.

The control of the beam parameter of the pulsed laser beam by the electrode gap varying section 20 may be performed by a configuration including the laser beam measurement section 40, the electrode gap varying section 20 provided on the laser chamber 10, and the laser controller 30.

As mentioned above, the laser beam measurement section 40 may include the beam splitter 41, the beam profile meter 42, the beam divergence meter 43, the beam splitter 44, and the mirror 45.

The beam splitter 41 may be disposed in the optical path of the pulsed laser beam that has been outputted from the output coupler 15. The beam splitter 41 may be disposed at an angle that allows the reflected light of the pulsed laser beam having entered the beam splitter 41 to enter the beam splitter 44.

The beam splitter 44 may be disposed at an angle that allows the reflected light of the pulsed laser beam having entered the beam splitter 44 to enter the beam profile meter 42.

The mirror 45 may be disposed in the optical path of the pulsed laser beam that has passed through the beam splitter 44. The mirror 45 may be disposed in such a manner that the pulsed laser beam that has entered the mirror 45 is reflected by the mirror 45 and the reflected pulsed laser beam then enters the beam divergence meter 43.

The beam profile meter 42 may include an image sensor 42a and a transfer optical system 42b. The image sensor 42a and the transfer optical system 42b may be disposed to allow a transferred image of the pulsed laser beam to be formed on an imaging surface of the image sensor 42a.

The beam divergence meter 43 may include an image sensor 43a and a light condensing lens 43b. The image sensor 43a and the light condensing lens 43b may be disposed to allow an imaging surface of the image sensor 43a to be located at a position of the focal distance fa of the light condensing lens 43b.

Image data obtained by the image sensor 42a and the image sensor 43a may be transmitted to the laser controller 30.

The laser controller 30 may be coupled to the driver 22 of the electrode gap varying section 20 provided on the laser chamber 10.

[3.2 Operation]

The laser controller 30 may measure the beam size in the V direction with use of the beam profile meter 42 and control the electrode gap varying section 20 to allow the beam size to be the target beam size in the V direction. Further, the laser controller 30 may measure the beam divergence in the V direction with use of the beam divergence meter 43, and control the electrode gap varying section 20 to allow the beam divergence to be the target beam divergence in the V direction.

[3.3 Action]

Since the laser controller 30 detects the beam parameter B (such as the beam size and the beam divergence) of the pulsed laser beam and controls the electrode gap varying section 20 to allow the beam parameter B to be the target beam parameter Bt, it is possible to stably control the beam parameter. For example, when the pair of discharge electrodes 11a and 11b is consumed and worn, the laser controller 30 may adjust the gap between the discharge electrodes 11a and 11b through activating the electrode gap varying section 20 based on information measured by the laser beam measurement section 40. This makes it possible to stabilize the beam parameter.

[3.4 Others]

The image sensor 42a and the image sensor 43a each may be a one-dimensional or two-dimensional photodiode array sensor. When the image sensor 42a or the image sensor 43a is a one-dimensional photodiode array sensor, the image sensor 42a or the image sensor 43a may be disposed to allow photodiodes to be arrayed in the V direction.

[3.5 Method of Controlling Beam Parameter by Electrode Gap Varying Section]

There is described a method of controlling the beam parameter by the electrode gap varying section in a case where the beam parameter of the pulsed laser beam is the beam size of the pulsed laser beam and in a case where the beam parameter of the pulsed laser beam is the beam divergence of the pulsed laser beam.

[3.5.1 Method of Controlling Beam Size]

A method of controlling the beam size of the pulsed laser beam by the electrode gap varying section is described with reference to FIG. 6. Specifically, the laser controller 30 may so adjust the gap G between the discharge electrodes 11a and 11b through activating the electrode gap varying section as to bring the beam size of the pulsed laser beam close to the target beam size as the predetermined beam size.

First, at step S102, the laser controller 30 may close the emission port shutter 50. More specifically, the laser controller 30 may inform the exposure apparatus controller 110 of a state where the laser apparatus is adjusting the electrode gap, and close the emission port shutter 50 to prevent the pulsed laser beam under adjustment from entering the exposure apparatus.

Next, at step S104, the laser controller 30 may read, from the exposure apparatus controller 110, a target beam size Bwvt of the pulsed laser beam in the V direction and the tolerance ΔBwvmas of the difference between the beam size and the target beam size Bwvt. Note that the target beam size Bwvt of the pulsed laser beam in the V direction may be one of the target beam parameters.

Next, at step S106, the beam profile meter 42 may measure a beam size Bwv in the V direction under the control of the laser controller 30. More specifically, a sub-routine of beam size measurement described later may be executed.

Next, at step S108, the gap G between the discharge electrodes 11a and 11b may be so adjusted as to bring a difference ΔBwv between the target beam size Bwvt and the beam size Bwv close to zero under the control of the laser controller 30. More specifically, a sub-routine of adjusting the electrode gap G, described later, may be executed.

Next, at step S110, the beam profile meter 42 may measure the beam size Bwv in the V direction again under the control of the laser controller 30. More specifically, the sub-routine of the beam size measurement described later may be executed.

Next, at step S112, the laser controller 30 may determine whether or not an absolute value of the difference ΔBwv is equal to or smaller than the tolerance ΔBwvmax. In other words, the laser controller 30 may determine whether an expression of |ΔBwv|≤ΔBwvmax is satisfied. When the expression of |ΔBwv|≤ΔBwvmax is satisfied, the process may proceed to step S114. When the expression of |ΔBwv|≤ΔBwvmax is not satisfied, the process may proceed to step S108.

Next, at step S114, the laser controller 30 may open the emission port shutter 50. More specifically, the laser controller 30 may inform the exposure apparatus controller 110 of completion of the electrode gap adjustment in the laser apparatus, and open the emission port shutter 50 to allow the pulsed laser beam to enter the exposure apparatus. Note that, when the emission port shutter 50 has been already opened by, for example, any other control performed during the execution of the flowchart, the step may be skipped. In this case, for example, the laser controller 30 transmits a signal to open the emission port shutter 50; but operation to open the emission port shutter 50 is not performed because the emission port shutter 50 has been already opened.

Next, at step S116, the laser controller 30 may determine whether the target beam size Bwvt has been changed in the exposure apparatus 100. More specifically, the laser controller 30 may perform determination based on whether the laser controller 30 has received, from the exposure apparatus control section 110, information indicating that the target beam size Bwvt has been changed. When the target beam size Bwvt has been changed in the exposure apparatus 100, the process may proceed to step S102. When the target beam size Bwvt has not been changed in the exposure apparatus 100, the process may proceed to step S108.

Figure 7:
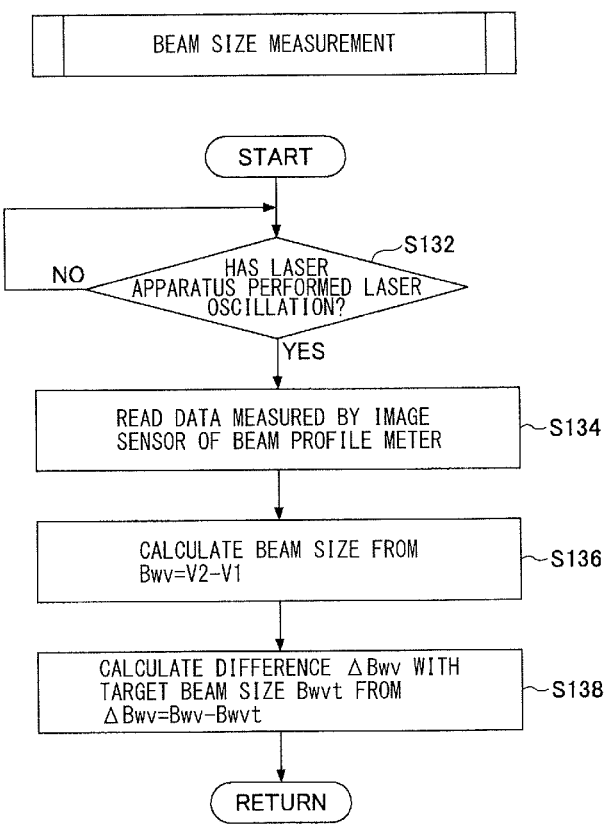
FIG. 7 is a flowchart (2) of the method of controlling the beam size by the electrode gap varying section.

The sub-routine of the beam size measurement executed at step S106 and step S110 mentioned above is described with reference to FIG. 7.

First, at step S132, the laser controller 30 may determine whether the laser apparatus has performed laser oscillation. When the laser apparatus has performed laser oscillation, the process may proceed to step S134. When the laser apparatus has not performed laser oscillation, step S132 may be repeated.

Next, at step S134, the laser controller 30 may read data measured by the image sensor 42a of the beam profile meter 42.

Figure 8:
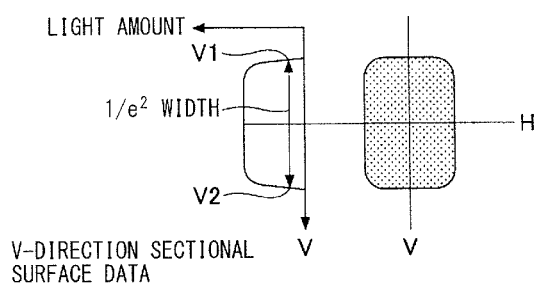
FIG. 8 is an explanatory diagram of the beam size to be detected.

Next, at step S136, the laser controller 30 may calculate the beam size Bwv of the pulsed laser beam. For example, the beam profile of the pulsed laser beam may be measured in a manner as illustrated in FIG. 8 by the image sensor 42a of the beam profile meter 42. The beam size Bwv of the pulsed laser beam in the V direction may have a width of a range equal to or higher than a range from 5% to 13% of the peak of the light amount of the pulsed laser beam, for example, a width of a range equal to or higher than $1/e^2$ of light amount. In other words, when one end of the pulsed laser beam in the V direction at which the light amount becomes $1/e^2$ of the peak of the light amount is denoted by V1 and the other end thereof is denoted by V2, the beam size Bwv of the pulsed laser beam in the V direction may be calculated from an expression of Bwv=V2−V1.

Next, at step S138, the difference ΔBwv between the beam size Bwv of the pulsed laser beam and the target beam size Bwvt may be calculated. More specifically, the difference ΔBwv may be calculated from the beam size Bwv of the pulsed laser beam in the V direction calculated at step S136 and the target beam size Bwvt of the pulsed laser beam in the V direction.

Figure 6:
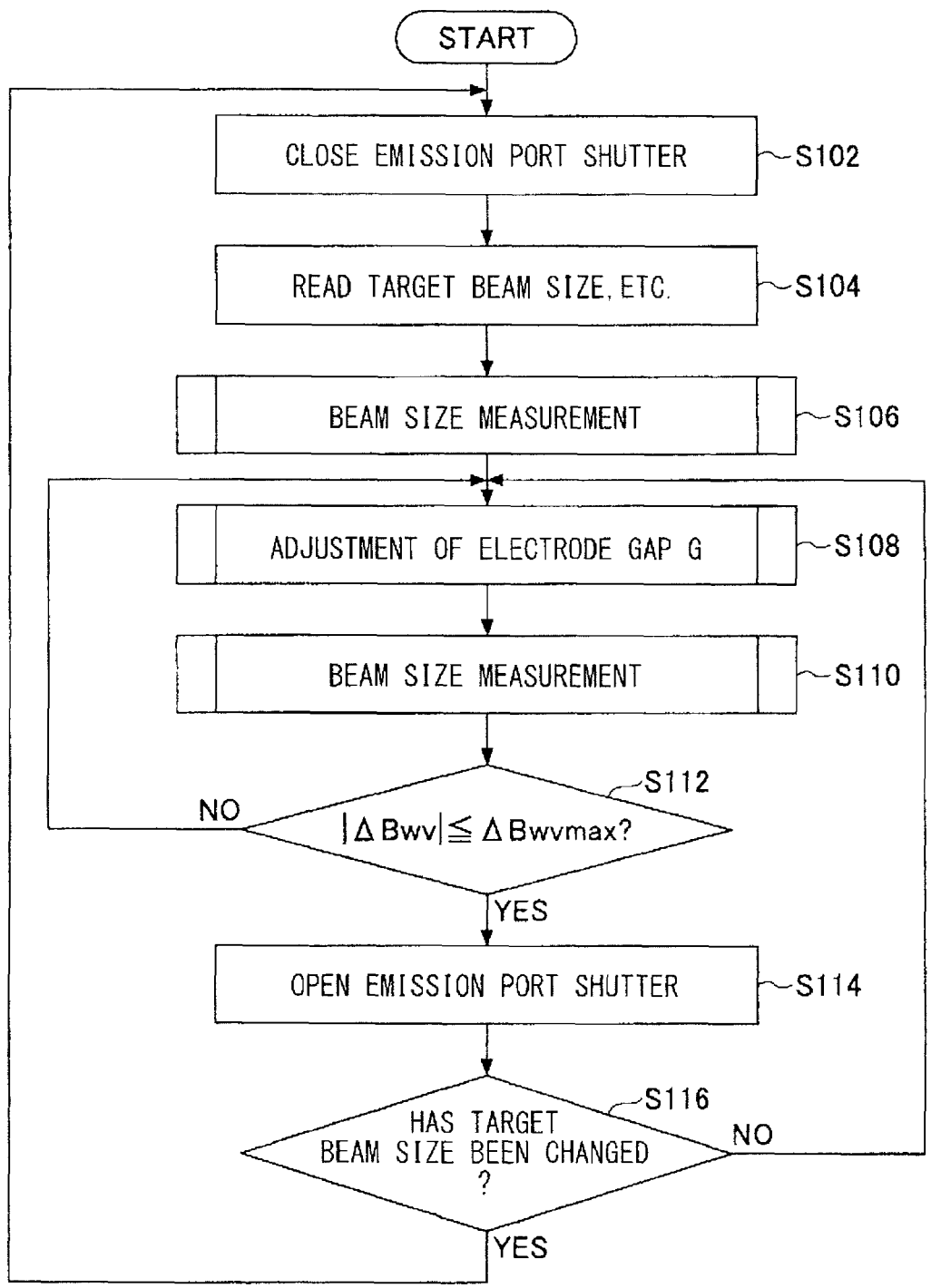
FIG. 6 is a flowchart (1) of a method of controlling a beam size by the electrode gap varying section.

The sub-routine of the beam size measurement may be thus completed, and the process may then return to the main routine illustrated in FIG. 6.

Figure 9:
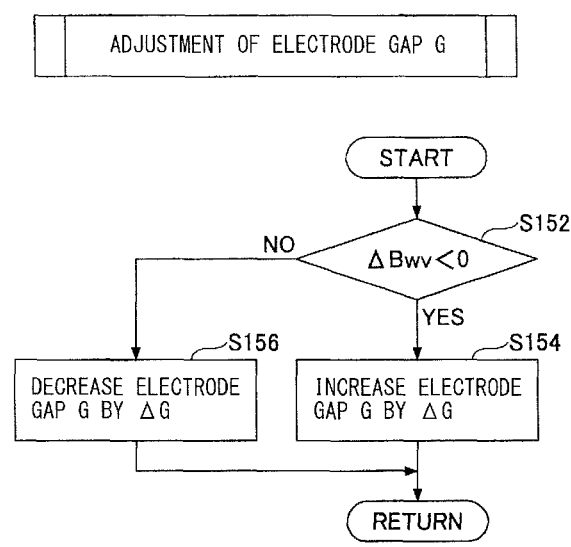
FIG. 9 is a flowchart (3) of the method of controlling the beam size by the electrode gap varying section.

Next, the sub-routine of adjusting the electrode gap G executed at step S108 mentioned above is described with reference to FIG. 9.

First, at step S152, it may be determined whether the difference ΔBwv is smaller than 0. When the difference ΔBwv is smaller than 0, the process may proceed to step S154. When the difference ΔBwv is not smaller than 0, the process may proceed to step S156.

Next, at step S154, the electrode gap G may be increased by ΔG. In other words, the electrode gap G that is the gap between the first discharge electrode 11a and the second discharge electrode 11b may be increased by ΔG. The value of ΔG may be a predetermined constant or a value calculated from an expression of $\Delta G = k_1 \times \Delta Bwv$. Note that $k_1$ may be a constant determined by, for example, experiments.

In contrast, at step S156, the electrode gap G may be decreased by ΔG. In other words, the electrode gap G that is the gap between the first discharge electrode 11a and the second discharge electrode 11b may be decreased by ΔG.

The sub-routine of adjusting the electrode gap G may be thus completed, and the process may then return to the main routine illustrated in FIG. 6.

[3.5.2 Method of Controlling Beam Divergence]

A method of controlling the beam divergence of the pulsed laser beam by the electrode gap varying section is described with reference to FIG. 10. Specifically, the laser controller 30 may so adjust the gap G between the discharge electrodes 11a and 11b through activating the electrode gap varying section as to bring the beam divergence of the pulsed laser beam close to the target beam divergence that is the predetermined beam divergence.

First, at step S202, the laser controller 30 may close the emission port shutter 50. More specifically, the laser controller 30 may inform the exposure apparatus controller 110 of the state where the laser apparatus is adjusting the electrode gap, and close the emission port shutter 50 to prevent the pulsed laser beam under adjustment from entering the exposure apparatus.

Next, at step S204, the laser controller 30 may read, from the exposure apparatus controller 110, the target beam divergence Bdvt of the pulsed laser beam in the V direction and the tolerance ΔBdvmax of the difference between the beam divergence of the pulsed laser beam and the target beam divergence Bdvt. Note that the target beam divergence Bdvt of the pulsed laser beam in the V direction may be one of the target beam parameters.

Next, at step S206, the beam divergence meter 43 may measure the beam divergence Bdv in the V direction under the control of the laser controller 30. More specifically, a sub-routine of beam divergence measurement described later may be executed.

Next, at step S208, the gap G between the discharge electrodes 11a and 11b may be so adjusted as to bring the difference ΔBdv between the target beam divergence Bdvt and the beam divergence Bdv close to zero under the control of the laser controller 30. More specifically, a sub-routine of adjusting the electrode gap G, described later, may be executed.

Next, at step S210, the beam divergence meter 43 may measure the beam divergence Bdv in the V direction again under the control of the laser controller 30. More specifically, the sub-routine of the beam divergence measurement described later may be executed.

Next, at step S212, the laser controller 30 may determine whether or not an absolute value of the difference ΔBdv is equal to or smaller than the tolerance ΔBdvmax. In other words, the laser controller 30 may determine whether an expression of $|\Delta Bdv| \leq \Delta Bdvmax$ is satisfied. When the expression of $|\Delta Bdv| \leq \Delta Bdvmax$ is satisfied, the process may proceed to step S214. When the expression of $|\Delta Bdv| \leq \Delta Bdvmax$ is not satisfied, the process may proceed to step S208.

Next, at step S214, the laser controller 30 may open the emission port shutter 50. More specifically, the laser controller 30 may inform the exposure apparatus controller 110 of completion of the electrode gap adjustment by the laser apparatus, and open the emission port shutter 50 to allow the pulsed laser beam to enter the exposure apparatus. Note that, when the emission port shutter 50 has been already opened, the step may be skipped. In this case, for example, the laser controller 30 transmits a signal to open the emission port shutter 50; but operation to open the emission port shutter 50 is not performed because the emission port shutter 50 has been already opened.

Next, at step S216, the laser controller 30 may determine whether the target beam divergence Bdvt has been changed in the exposure apparatus 100. More specifically, the laser controller 30 may perform determination based on whether the laser controller 30 has received, from the exposure apparatus controller 110, information indicating that the target beam divergence Bdvt has been changed. When the target beam divergence Bdvt has been changed in the exposure apparatus 100, the process may proceed to step S202. When the target beam divergence Bdvt has not been changed in the exposure apparatus 100, the process may proceed to step S208.

Figure 11:
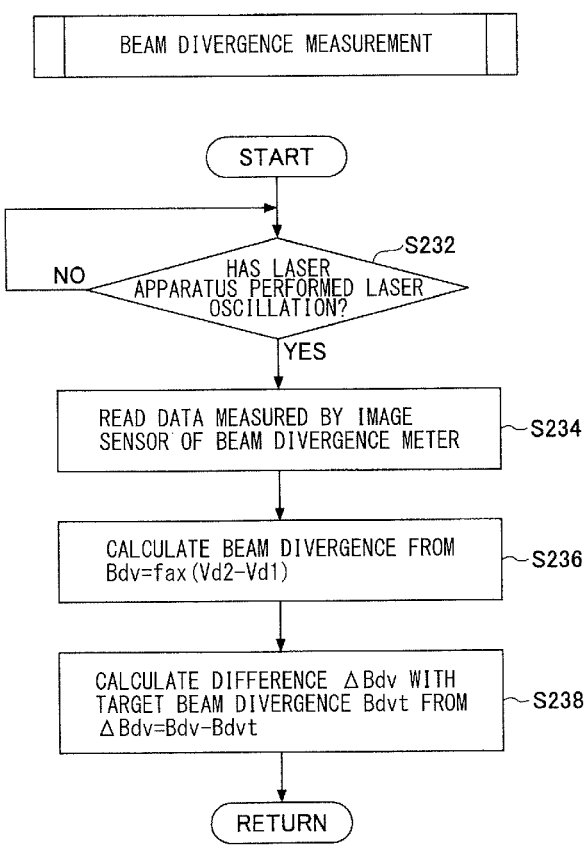
FIG. 11 is a flowchart (2) of the method of controlling the beam divergence by the electrode gap varying section.

Next, the sub-routine of the beam divergence measurement executed at step S206 and step S210 mentioned above is described with reference to FIG. 11.

First, at step S232, the laser controller 30 may determine whether the laser apparatus has performed laser oscillation. When the laser apparatus has performed laser oscillation, the process may proceed to step S234. When the laser apparatus has not performed laser oscillation, the process may repeat step S232.

Next, at step S234, the laser controller 30 may read data measured by the image sensor 43a of the beam divergence meter 43.

Figure 12:
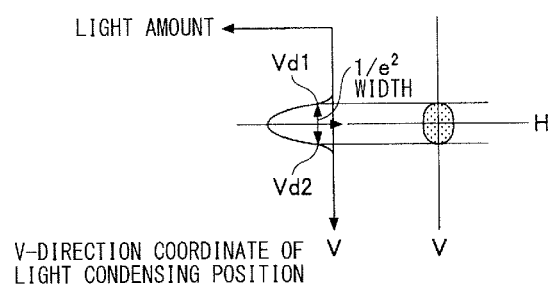
FIG. 12 is an explanatory diagram of the beam divergence to be detected.

Next, at step S236, the laser controller 30 may calculate the beam divergence Bdv of the pulsed laser beam. For example, the image sensor 43a of the beam divergence meter 43 may measure the beam divergence of the pulsed laser beam in a manner as illustrated in FIG. 12. The beam divergence Bdv of the pulsed laser beam in the V direction may have a width of a range equal to or higher than a range from 5% to 10% of the peak value of the light amount of the pulsed laser beam, for example, a width of a range equal to or higher than $1/e^2$ of the light amount. In other words, when one end of the pulsed laser beam in the V direction at which the light amount becomes $1/e^2$ of the peak value of the light amount is denoted by Vd1 and the other end thereof is denoted by Vd2, the beam divergence Bdv of the pulsed laser beam in the V direction may be calculated from an expression of $Bdv = fa \times (Vd2 - Vd1)$.

Next, at step S238, the difference ΔBdv between the beam divergence Bdv of the pulsed laser beam and the target beam divergence Bdvt of the pulsed laser beam may be calculated. More specifically, the difference ΔBdv may be calculated from the beam divergence Bdv of the pulsed laser beam in the V direction calculated at step S236 and the target beam divergence Bdvt of the pulsed laser beam in the V direction.

Figure 10:
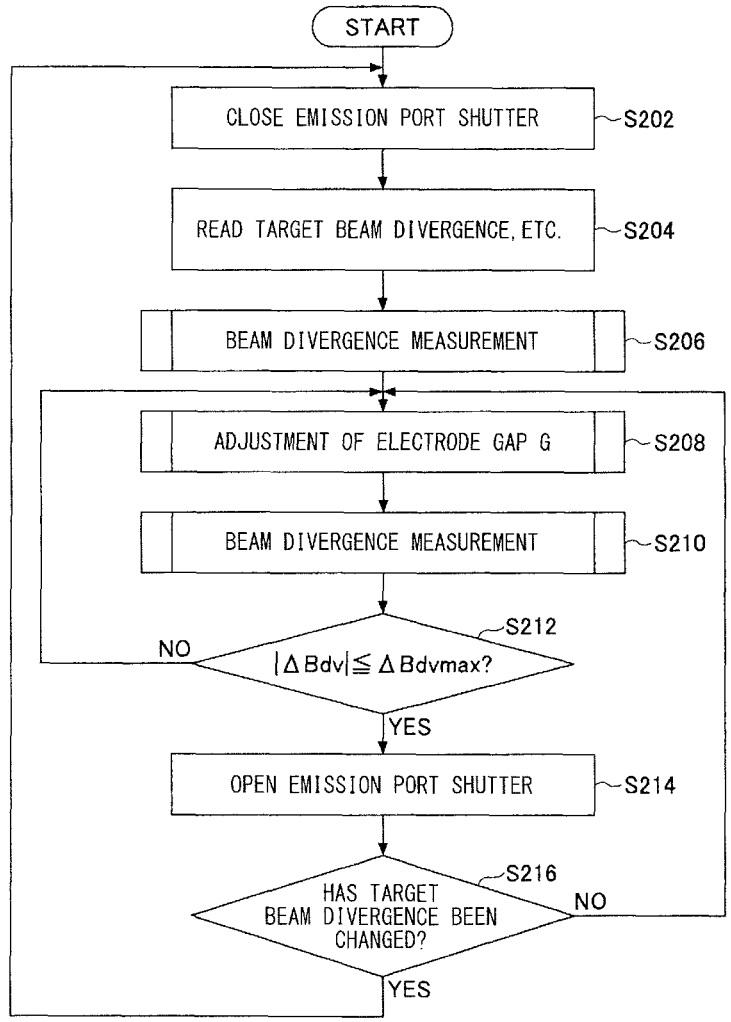
FIG. 10 is a flowchart (1) of a method of controlling beam divergence by the electrode gap varying section.

The sub-routine of the beam divergence measurement may be thus completed, and the process may then return to the main routine illustrated in FIG. 10.

Figure 13:
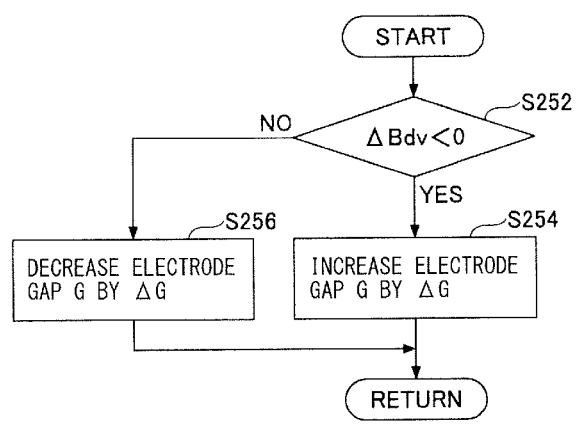
FIG. 13 is a flowchart (3) of the method of controlling the beam divergence by the electrode gap varying section.

The sub-routine of adjusting the electrode gap G executed at step S208 mentioned above is described with reference to FIG. 13.

First, at step S252, it may be determined whether the difference ΔBdv is smaller than 0. When the difference ΔBdv is smaller than 0, the process may proceed to step S254. When the difference ΔBdv is not smaller than 0, the process may proceed to step S256.

Next, at step S254, the electrode gap G may be increased by ΔG. In other words, the electrode gap G that is the gap between the first discharge electrode 11a and the second discharge electrode 11b may be increased by ΔG. The value of ΔG may be a predetermined constant or may be calculated from an expression of $\Delta G = k_2 \times \Delta Bdv$. Note that $k_2$ may be a constant determined by, for example, experiments.

In contrast, at step S256, the electrode gap G may be decreased by ΔG. In other words, the electrode gap G that is the gap between the first discharge electrode 11a and the second discharge electrode 11b may be decreased by ΔG.

The sub-routine of adjusting the electrode gap G may be thus completed, and the process may then return to the main routine illustrated in FIG. 10.

[4. Pulse Energy Control by Electrode Gap Varying Section]

[4.1 Configuration]

Figure 14:
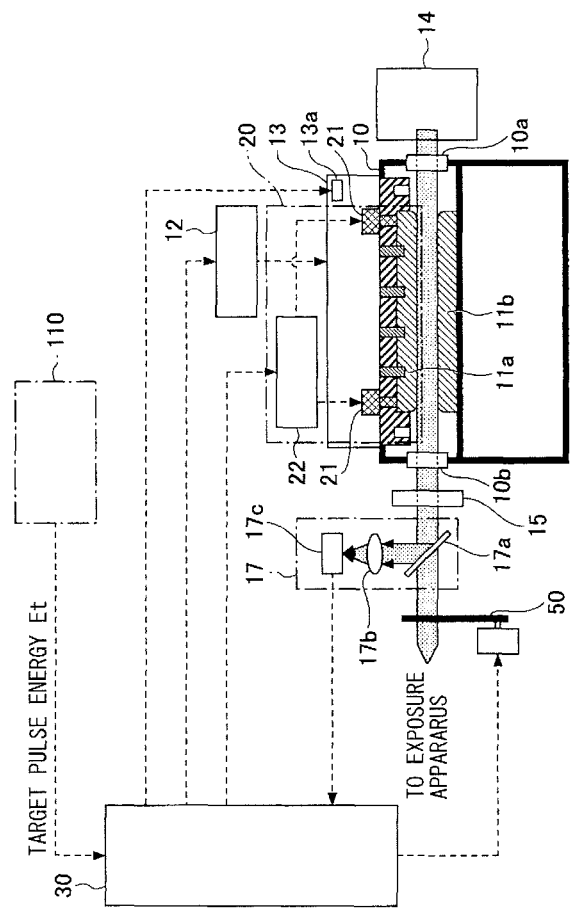
FIG. 14 is an explanatory diagram of pulse energy control by the electrode gap varying section.

A configuration used to control the pulse energy of the pulsed laser beam in the laser apparatus according to the embodiment of the disclosure is described with reference to FIG. 14.

The pulse energy control of the pulsed laser beam may be performed by the configuration including the pulse energy measurement section 17, the electrode gap varying section 20 disposed on the laser chamber 10, and the laser controller 30.

The laser controller 30 may be coupled to the light sensor 17c of the pulse energy measurement section 17 and the exposure apparatus controller 110. The laser controller 30 may receive a signal from the light sensor 17c of the pulse energy measurement section 17 and a signal from the exposure apparatus controller 110.

The laser controller 30 may be coupled to the charger 12, the switch 13a of the pulse power module 13, and the driver 22 of the electrode gap varying section 20. The laser controller 30 may output a signal of information of the charging voltage to the charger 12 and output a control signal to the switch 13a of the pulse power module 13 and the driver 22 of the electrode gap varying section 20.

[4.2 Operation]

The laser controller 30 may receive, from the exposure apparatus controller 110 of the exposure apparatus 100, target pulse energy Et and a tolerance ΔEmax of the difference between the target pulse energy Et and the pulse energy of the pulsed laser beam.

The laser controller 30 may set, based on the value of the target pulse energy Et, the corresponding electrode gap G and the corresponding charging voltage Vhv.

The laser controller 30 may operate the switch 13a of the pulse power module 13 in synchronization with a signal from an unillustrated pulse oscillator, and apply a pulsed high voltage between the discharge electrodes 11a and 11b. As a result, electric discharge occurs between the discharge electrodes 11a and 11b to excite the laser gas, which results in laser oscillation between the output coupler 15 and the line narrowing module 14. The pulsed laser beam may be accordingly outputted from the output coupler 15.

The pulsed laser beam outputted from the output coupler 15 may enter the beam splitter 17a of the pulse energy measurement section 17. A part of the entered pulsed laser beam may be reflected by the beam splitter 17a and the other part may pass through the beam splitter 17a. The pulsed laser beam that has been reflected by the beam splitter 17a may be condensed by the condensing lens 17b, and the condensed pulsed laser beam may enter the light sensor 17c.

A value measured by the light sensor 17c of the pulse energy measurement section 17 may be transmitted to the laser controller 30, and be converted into the pulse energy E of the pulsed laser beam based on the reflectance of the beam splitter 17a.

The laser controller 30 may determine the difference ΔE (=E−Et) between the pulse energy E of the pulsed laser beam obtained through conversion and the target pulse energy Et, and so set the value of the charging voltage Vhv as to bring the difference ΔE close to zero. Then, the laser controller 30 may transmit the information of the charging voltage Vhv to the charger 12. Thereafter, the laser controller 30 may measure and convert the pulse energy E of the pulsed laser beam again, and determine whether or not an absolute value |ΔE| of the difference between the pulse energy E of the pulsed laser beam and the target pulse energy Et becomes equal to or smaller than the tolerance ΔEmax.

When the absolute value |ΔE| is not equal to or smaller than the tolerance ΔEmax, the laser controller 30 may further so set the charging voltage Vhv as to bring the difference ΔE close to zero. When the absolute value |ΔE| is equal to or smaller than the tolerance ΔEmax, the laser controller 30 may inform the exposure apparatus controller 110 of completion of the electrode gap adjustment.

[4.3 Action]

Since the laser controller 30 adjusts the electrode gap G through activating the electrode gap varying section 20 based on the target pulse energy Et received from the exposure apparatus controller 110, it is possible to largely vary the pulse energy of the pulsed laser beam in a short time, as compared with the case where the pressure of the laser gas is varied.

[4.4 Method of Controlling Pulse Energy by Electrode Gap Varying Section]

Figure 15:
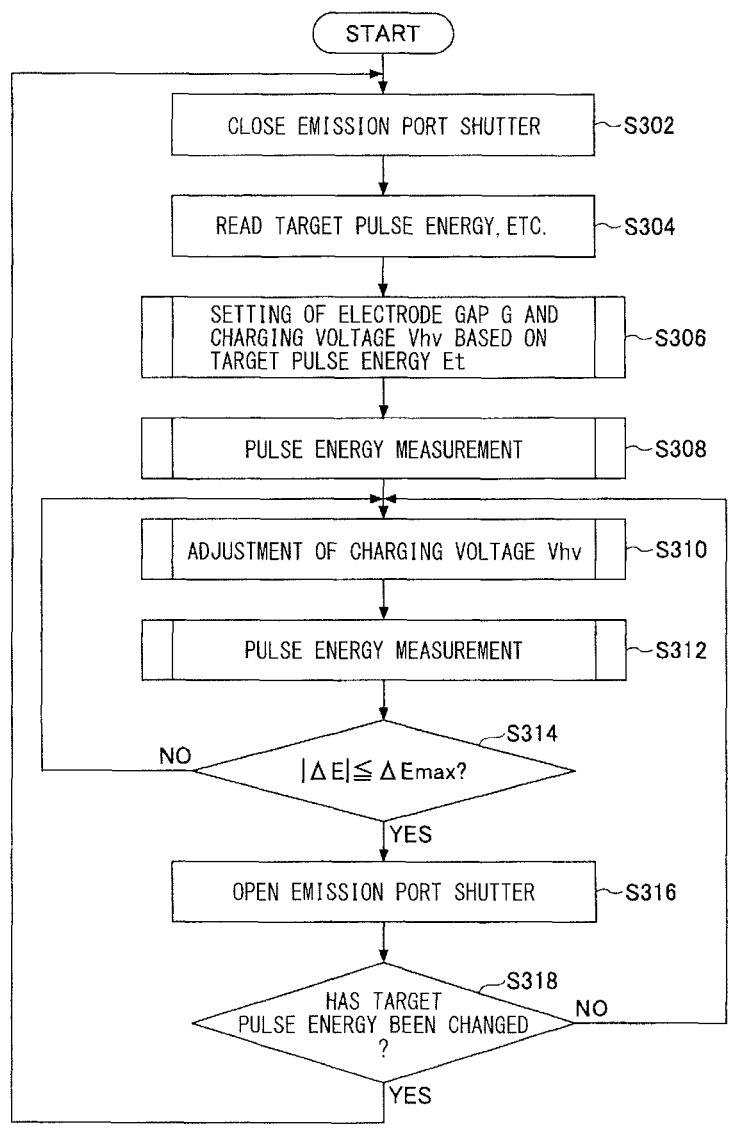
FIG. 15 is a flowchart (1) of a method of controlling pulse energy by the electrode gap varying section.

A method of controlling the pulse energy of the pulsed laser beam by the electrode gap varying section is described with reference to FIG. 15.

First, at step S302, the laser controller 30 may close the emission port shutter 50. More specifically, the laser controller 30 may inform the exposure apparatus controller 110 of the state where the laser apparatus is adjusting the electrode gap, and close the emission port shutter 50 to prevent the pulsed laser beam under the adjustment from entering the exposure apparatus.

Next, at step S304, the laser controller 30 may read, from the exposure apparatus controller 110, the target pulse energy Et and a tolerance ΔEmax of the difference between the pulse energy of the pulsed laser beam and the target pulse energy Et.

Next, at step S306, the laser controller 30 may set, based on the target pulse energy Et that is a predetermined pulse energy, the corresponding electrode gap G and the corresponding charging voltage Vhv. As a result, the gap between the discharge electrodes 11a and 11b may become the gap G by the electrode gap varying section 20, and the charging voltage of the charger 12 may become the charging voltage Vhv. More specifically, a sub-routine of setting the electrode gap G and the charging voltage Vhv, described later, based on the target pulse energy Et may be executed.

Next, at step S308, the laser controller 30 may measure the pulse energy of the pulsed laser beam with use of the light sensor 17c of the pulse energy measurement section 17. More specifically, a sub-routine of the pulse energy measurement described later may be executed.

Next, at step S310, the laser controller 30 may so adjust the charging voltage Vhv as to bring the difference ΔE close to zero. More specifically, a sub-routine of adjusting the charging voltage Vhv, described later, may be executed.

Next, at step S312, the laser controller 30 may measure the pulse energy of the pulsed laser beam again with use of the light sensor 17c of the pulse energy measurement section 17. More specifically, the sub-routine of the pulse energy measurement described later may be executed.

Next, at step S314, the laser controller 30 may determine whether or not the absolute value of the difference ΔE is equal to or smaller than the tolerance ΔEmax. In other words, the laser controller 30 may determine whether an expression of |ΔE|≤ΔEmax is satisfied. When the expression of |ΔE|≤ΔEmax is satisfied, the process may proceed to step S316. When the expression of |ΔE|≤ΔEmax is not satisfied, the process may proceed to step S310.

Next, at step S316, the laser controller 30 may open the emission port shutter 50. More specifically, the laser controller 30 may inform the exposure apparatus controller 110 of completion of the electrode gap adjustment and the charging voltage adjustment in the laser apparatus, and open the emission port shutter 50 to allow the pulsed laser beam to enter the exposure apparatus. Note that, when the emission port shutter 50 has been already opened, the step may be skipped. In this case, for example, the laser controller 30 may transmit a signal to open the emission port shutter 50; but the operation to open the emission port shutter 50 is not performed because the emission port shutter 50 has been already opened.

Next, at step S318, the laser controller 30 may determine whether the target pulse energy Et has been changed in the exposure apparatus 100. More specifically, the laser controller 30 may perform determination based on whether the laser controller 30 has received, from the exposure apparatus controller 110, information indicating that the target pulse energy Et has been changed. When the target pulse energy Et has been changed in the exposure apparatus 100, the process may proceed to step S302. When the target pulse energy Et has not been changed in the exposure apparatus 100, the process may proceed to step S310.

The sub-routine of setting the electrode gap G and the charging voltage Vhv based on the target pulse energy Et that is executed at step S306 mentioned above is described.

Figure 16:
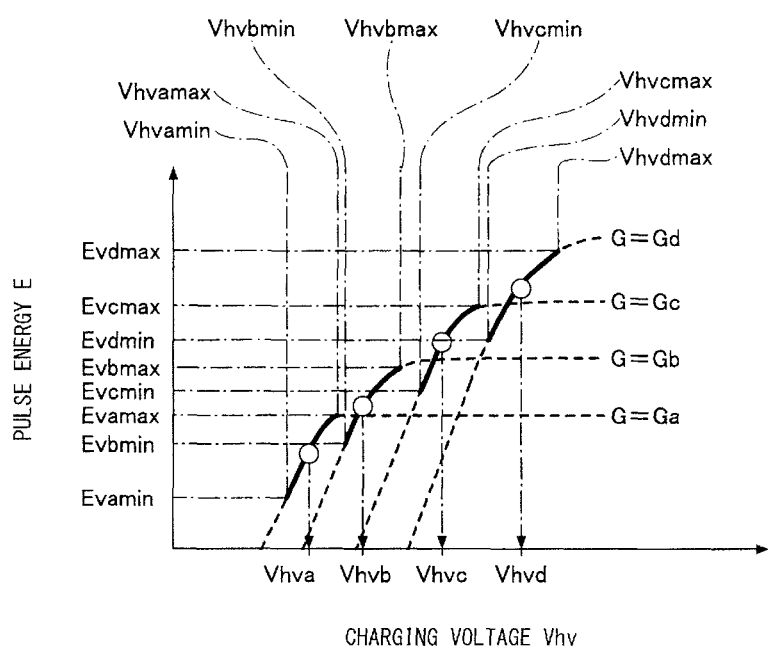
FIG. 16 is a diagram illustrating correlation between a charging voltage and the pulse energy.

First, relationship between the charging voltage Vhv and the pulse energy E of the pulsed laser beam is described with reference to FIG. 16. As illustrated in FIG. 16, typically, when the charging voltage Vhv is set high, the pulse energy E of the pulsed laser beam also becomes high; but the pulse energy E of the pulsed laser beam is saturated at a certain value. The pulse energy E also depends on the electrode gap G, and the saturation of the pulse energy E depends on the value of the electrode gap G. Therefore, in the present embodiment, to obtain desired pulse energy E of the pulsed laser beam, the electrode gap G may be varied, and further both of the electrode gap G and the charging voltage Vhv may be varied.

For example, when the electrode gap G is set to Ga, varying the charging voltage Vhv within a range from Vhvamin to Vhvamax may vary the pulse energy E within a range from Evamin to Evamax.

When the electrode gap G is set to Gb, varying the charging voltage Vhv within a range from Vhvbmin to Vhvbmax may vary the pulse energy E within a range from Evbmin to Evbmax.

When the electrode gap G is set to Gc, varying the charging voltage Vhv within a range from Vhvcmin to Vhvcmax may vary the pulse energy E within a range from Evcmin to Evcmax.

When the electrode gap G is set to Gd, varying the charging voltage Vhv within a range from Vhvdmin to Vhvdmax may vary the pulse energy E within a range from Evdmin to Evdmax.

The range of the pulse energy E from Evamin to Evamax may be partially overlapped with the range from Evbmin to Evbmax. The range of the pulse energy E from Evbmin to Evbmax may be partially overlapped with the range from Evcmin to Evcmax. The range of the pulse energy E from Evcmin to Evcmax may be partially overlapped with the range from Evdmin to Evdmax. Accordingly, varying the electrode gap G and the charging voltage Vhv may continuously vary the pulse energy E.

Note that the range of the charging voltage Vhv from Vhvamin to Vhvamax may be a range in which the pulse energy E of the pulsed laser beam may be stably maintained when the electrode gap G is set to Ga, and an average of Vhvamin and Vhvamax may be Vhva. In other words, an expression of Vhva=(Vhvamin+Vhvamax)/2 may be established.

The range of the charging voltage Vhv from Vhvbmin to Vhvbmax may be a range in which the pulse energy E of the pulsed laser beam may be stably maintained when the electrode gap G is set to Gb, and an average of Vhvbmin and Vhvbmax may be Vhvb. In other words, an expression of Vhvb=(Vhvbmin+Vhvbmax)/2 may be established.

The range of the charging voltage Vhv from Vhvcmin to Vhvcmax may be a range in which the pulse energy E of the pulsed laser beam may be stably maintained when the electrode gap G is set to Gc, and an average of Vhvcmin and Vhvcmax may be Vhvc. In other words, an expression of Vhvc=(Vhvcmin+Vhvcmax)/2 may be established.

The range of the charging voltage Vhv from Vhvdmin to Vhvdmax may be a range in which the pulse energy E of the pulsed laser beam may be stably maintained when the electrode gap G is set to Gd, and an average of Vhvdmin and Vhvdmax may be Vhvd. In other words, an expression of Vhvd=(Vhvdmin+Vhvdmax)/2 is established.

For example, as illustrated in FIG. 17, when the pulse energy E of the pulsed laser beam is set to be smaller than 10 mJ, the electrode gap G may be set to Ga and the charging voltage Vhv may be set to Vhva. When the pulse energy E of the pulsed laser beam is set to 10 mJ or higher and smaller than 15 mJ, the electrode gap G may be set to Gb and the charging voltage Vhv may be set to Vhvb. When the pulse energy E of the pulsed laser beam is set to 15 mJ or higher and smaller than 20 mJ, the electrode gap G may be set to Gc and the charging voltage Vhv may be set to Vhvc. When the pulse energy E of the pulsed laser beam is set to 20 mJ or higher, the electrode gap G may be set to Gd and the charging voltage Vhv may be set to Vhvd.

Varying the electrode gap G and the charging voltage Vhv together in this way makes it possible to bring the pulse energy E of the pulsed laser beam close to the target pulse energy Et in a short time.

Figure 18:
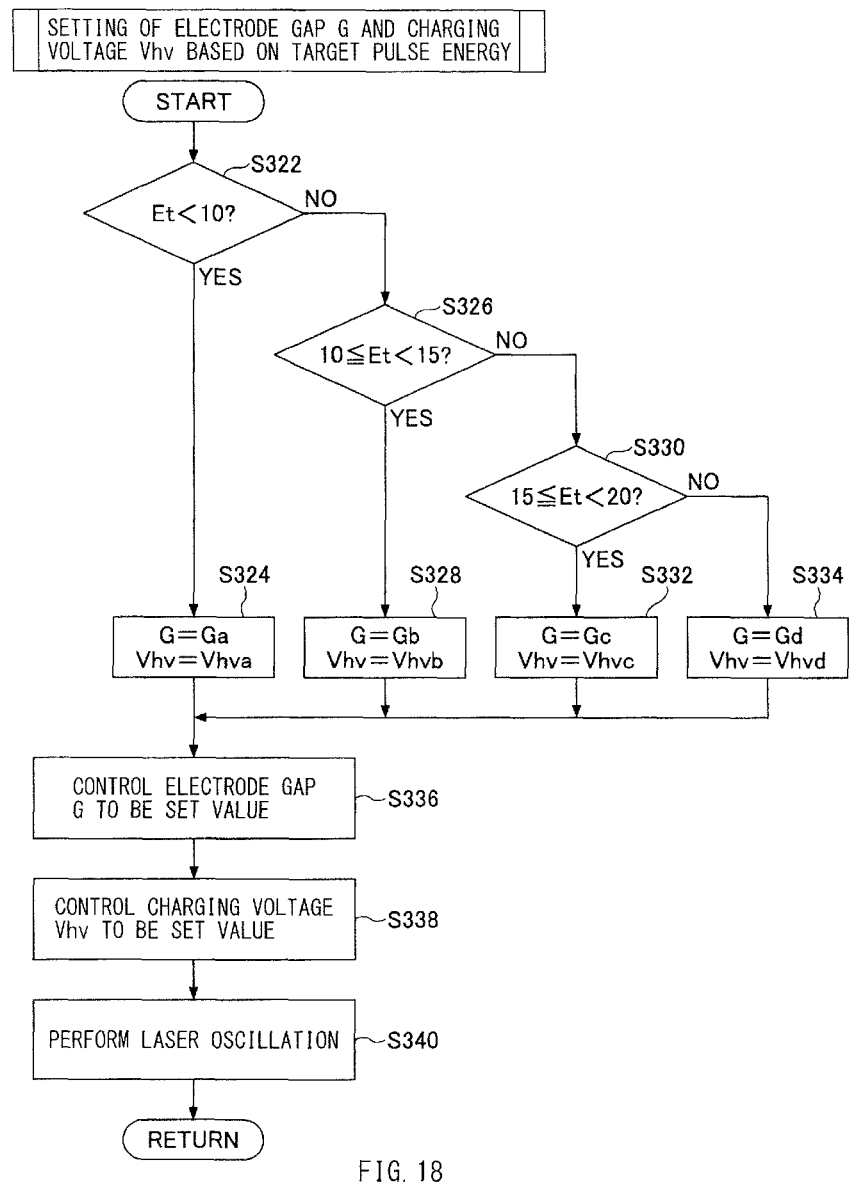
FIG. 18 is a flowchart (2) of the method of controlling the pulse energy by the electrode gap varying section.

The sub-routine of setting the electrode gap G and the charging voltage Vhv executed at step S306 mentioned above is specifically described with reference to FIG. 18.

First, at step S322, it may be determined whether the target pulse energy Et is smaller than 10 mJ. When the target pulse energy Et is smaller than 10 mJ, the process may proceed to step S324. When the target pulse energy Et is not smaller than 10 mJ, the process may proceed to step S326.

Next, at step S324, the electrode gap G may be set to Ga, and the charging voltage Vhv may be set to Vhva. Thereafter, the process may proceed to step S336.

At step S326, it may be determined whether the target pulse energy Et is 10 mJ or higher and smaller than 15 mJ. When the target pulse energy Et is 10 mJ or higher and smaller than 15 mJ, the process may proceed to step S328. When the target pulse energy Et is not in a range equal to 10 mJ or higher and smaller than 15 mJ, the process may proceed to step S330.

Next, at step S328, the electrode gap G may be set to Gb and the charging voltage Vhv may be set to Vhvb. Thereafter, the process may proceed to step S336.

At step S330, it may be determined whether the target pulse energy Et is 15 mJ or higher and smaller than 20 mJ. When the target pulse energy Et is 15 mJ or higher and smaller than 20 mJ, the process may proceed to step S332. When the target pulse energy Et is not in a range equal to 15 mJ or higher and smaller than 20 mJ, the process may proceed to step S334.

Next, at step S332, the electrode gap G may be set to Gc, and the charging voltage Vhv may be set to Vhvc. Thereafter, the process may proceed to step S336.

At step S334, the electrode gap G may be set to Gd, and the charging voltage Vhv may be set to Vhvd. Thereafter, the process may proceed to step S336.

Next, at step S336, the laser controller 30 may control the electrode gap G to be the set value. More specifically, the laser controller 30 may transmit the set value of the electrode gap G to the driver 22 of the electrode gap varying section 20, and move the first discharge electrode 11a with use of the electrode moving mechanisms 21. This may make the electrode gap G that is the gap between the first discharge electrode 11a and the second discharge electrode 11b be the set value.

Next, at step S338, the laser controller 30 may control the charging voltage Vhv in the charger 12 to be the set value.

Next, at step S340, the laser apparatus may perform laser oscillation. Thereafter, the process may return to the main routine illustrated in FIG. 15.

Figure 19:
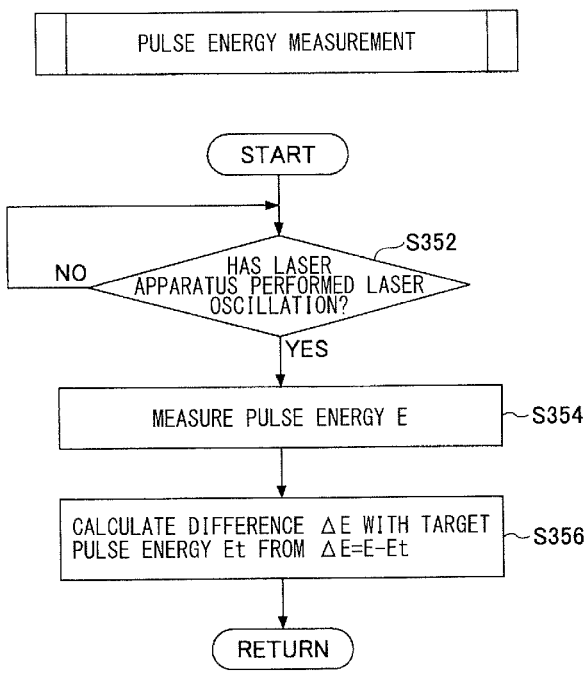
FIG. 19 is a flowchart (3) of the method of controlling the pulse energy by the electrode gap varying section.

The sub-routine of the pulse energy measurement executed at step S308 and step S312 described above is described with reference to FIG. 19.

First, at step S352, the laser controller 30 may determine whether the laser apparatus has performed laser oscillation. When the laser apparatus has performed laser oscillation, the process may proceed to step S354. When the laser apparatus has not performed laser oscillation, the process may repeat step S352.

Next, the laser controller 30 may measure the pulse energy E of the pulsed laser beam from the value measured by the light sensor 17c of the pulse energy measurement section 17. The measured value of the pulsed laser beam may be transmitted to the laser controller 30, and be converted to be measured as the pulse energy.

Next, at step S356, the laser controller 30 may calculate the difference $\Delta E$ between the target pulse energy Et and the pulse energy E of the pulsed laser beam measured at step S354. More specifically, the laser controller 30 may calculate the difference $\Delta E$ between the pulse energy E and the target pulse energy Et from an expression of $\Delta E = E - Et$.

Figure 20:
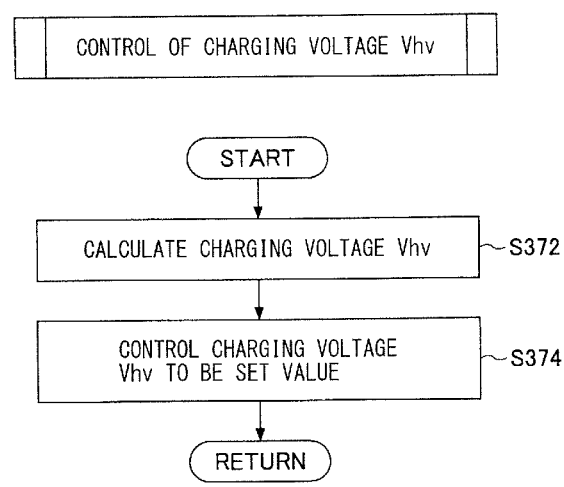
FIG. 20 is a flowchart (4) of the method of controlling the pulse energy by the electrode gap varying section.

The sub-routine of adjusting the charging voltage Vhv executed at step S310 mentioned above is described with reference to FIG. 20.

First, at step S372, the charging voltage Vhv to be newly set may be calculated based on the difference $\Delta E$ between the pulse energy E and the target pulse energy Et. More specifically, the charging voltage Vhv to be newly set may be calculated by subtracting $h \times \Delta E$ from the currently set charging voltage Vhv. Note that h may be a constant determined by, for example, experiments.

Next, at step S374, the laser controller 30 may control the charging voltage Vhv of the charger 12 to be the set value. Thereafter, the process may return to the main routine illustrated in FIG. 15.

[5. Control of Frequency of Pulsed Laser Beam by Electrode Gap Varying Section]

[5.1 Configuration and Operation]

Figure 21:
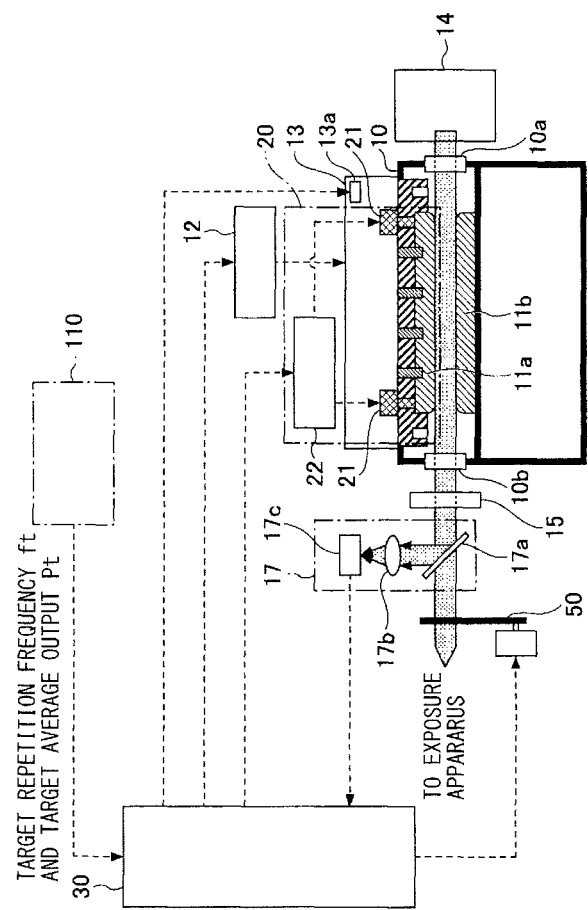
FIG. 21 is an explanatory diagram of frequency control of pulsed laser light by the electrode gap varying section.

FIG. 21 illustrates a configuration used to control a frequency of the pulsed laser beam in the laser apparatus according to the embodiment of the disclosure. The frequency control of the pulsed laser beam may be performed by the configuration including the pulse energy measurement section 17, the electrode gap varying section 20 disposed on the laser chamber 10, and the laser controller 30.

The exposure apparatus controller 110 may transmit a target frequency ft and a target average output Pt to the laser controller 30. The laser controller 30 may move the first discharge electrode 11a with use of the electrode moving mechanisms 21 of the electrode gap varying section 20, based on the received target frequency ft and the received target average output Pt. Moving the first discharge electrode 11a with use of the electrode moving mechanisms 21 of the electrode gap varying section 20 may adjust the electrode gap G that is the gap between the first discharge electrode 11a and the second discharge electrode 11b.

[5.2 Relationship between Electrode Gap G and Frequency f]

Figure 22A:
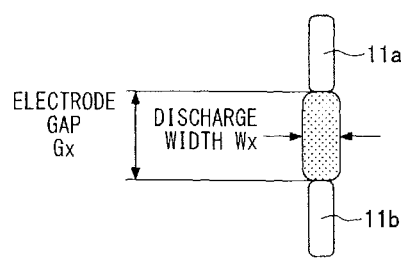
FIG. 22A is a diagram to explain relationship between the electrode gap and a frequency of the pulsed laser beam.
Figure 22B:
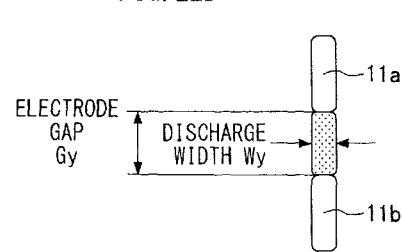
FIG. 22B is a diagram to explain relationship between the electrode gap and the frequency of the pulsed laser beam.

Relationship between the electrode gap G and the frequency f is described with reference to FIGS. 22A and 22B. Note that FIG. 22A illustrates a case where the electrode gap G is set to a long electrode gap Gx, and FIG. 22B illustrates a case where the electrode gap G is set to a short electrode gap Gy. When the electrode gap G is set to the long electrode gap Gx, a discharge width Wx in the discharge region is widened as illustrated in FIG. 22A, whereas when the electrode gap G is set to the short electrode gap Gy, a discharge width Wy in the discharge region is narrowed as illustrated in FIG. 22B.

The laser gas in a clearance between the discharge electrodes 11a and 11b may be circulated by rotation of the cross flow fan 18 disposed inside the laser chamber 10. When the electrode gap G is made short under the condition of the fixed rotation speed of the cross flow fan 18, namely, the fixed wind velocity in the clearance between the discharge electrodes 11a and 11b, the discharge width W may become narrow. Therefore, there may be a case where making the electrode gap G short increases the frequency f of the pulsed laser beam while maintaining stability of the pulse energy of the pulsed laser beam.

Figure 23:
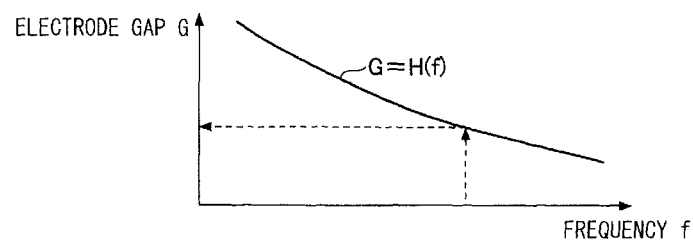
FIG. 23 is a diagram illustrating correlation between the frequency and the electrode gap.
Figure 24:
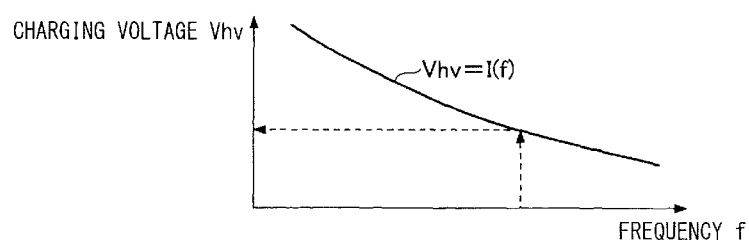
FIG. 24 is a diagram illustrating correlation between the frequency and the charging voltage.

FIG. 23 illustrates relationship between the frequency f of the pulsed laser beam and the electrode gap G, and FIG. 24 illustrates relationship between the frequency f of the pulsed laser beam and the charging voltage Vhv. As illustrated in FIG. 23, the frequency f of the pulsed laser beam and the electrode gap G have relationship of $G = H(f)$. When the frequency f of the pulsed laser beam is set high, the electrode gap G may be made short. As illustrated in FIG. 24, the frequency f of the pulsed laser beam and the charging voltage Vhv have relationship of $Vhv = I(f)$. When the frequency f of the pulsed laser beam is made high, the charging voltage Vhv may be made low.

Therefore, the electrode gap G set corresponding to the frequency f may be calculated from the function of $G = H(f)$.

Also, the charging voltage Vhv set corresponding to the frequency f may be calculated from the function of Vhv=I (f). Approximate expressions of these functions of G=H(f) and Vhv=I(f) may be obtained previously by, for example, experiments, and the obtained approximate expressions may be stored in the memory 31 of the laser controller 30.

[5.3 Method of Controlling Frequency of Pulsed Laser Beam by Electrode Gap Varying Section]

Figure 25:
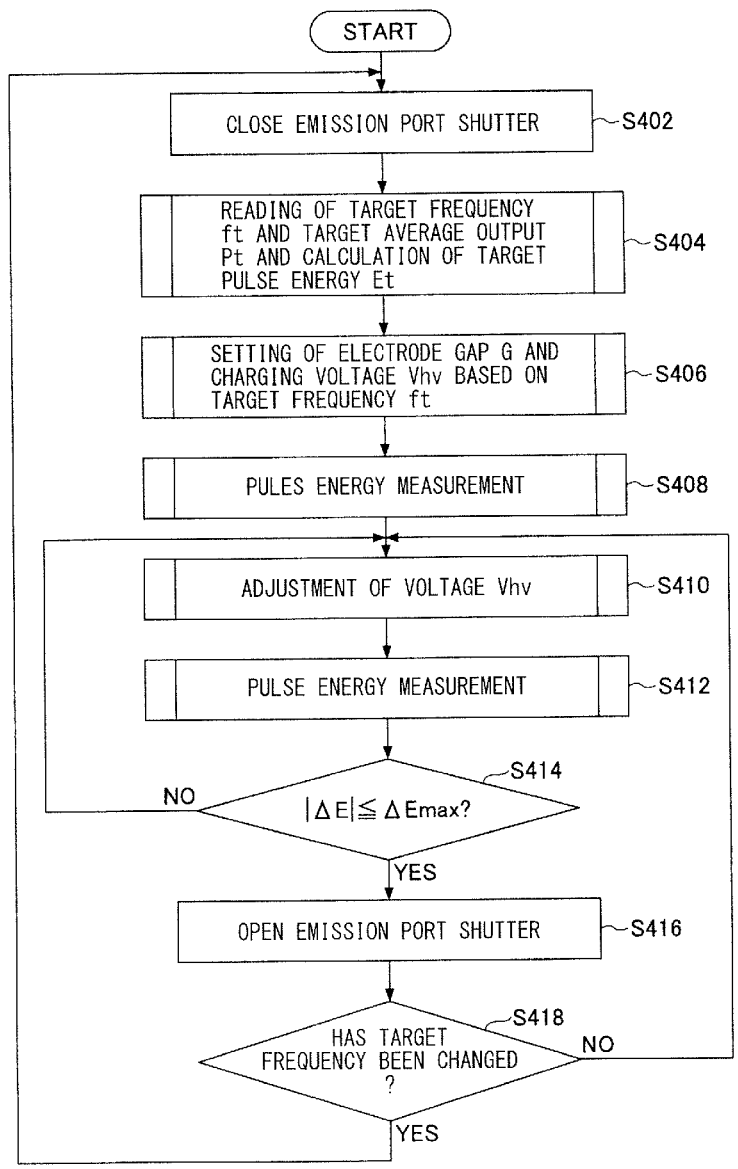
FIG. 25 is a flowchart (1) of a method of controlling the frequency of the pulsed laser light by the electrode gap varying section.

A method of controlling the frequency of the pulsed laser beam by the electrode gap varying section is described with reference to FIG. 25.

First, at step S402, the laser controller 30 may close the emission port shutter 50. More specifically, the laser controller 30 may inform the exposure apparatus controller 110 of the state where the laser apparatus is adjusting the electrode gap, and close the emission port shutter 50 to prevent the pulsed laser beam under adjustment from entering the exposure apparatus.

Next, at step S404, the laser controller 30 may read the target frequency ft and the target average output Pt of the pulsed laser beam, and calculate the target pulse energy Et. More specifically, a sub-routine of reading the target frequency ft and the target average output Pt and calculating the target pulse energy Et, described later, may be executed.

Next, at step S406, the laser controller 30 may set, based on the target frequency ft that is the predetermined frequency of the pulsed laser beam, the corresponding electrode gap G and the charging voltage Vhv. Thus, the gap between the discharge electrodes 11a and 11b may become the gap G by the electrode gap varying section 20 and the charging voltage of the charger 12 may become the charging voltage Vhv. More specifically, a sub-routine of setting the electrode gap G and the charging voltage Vhv based on the target frequency ft, described later, may be executed.

Next, at step S408, the laser controller 30 may measure the pulse energy of the pulsed laser beam with use of the light sensor 17c of the pulse energy measurement section 17. More specifically, the sub-routine of the pulse energy measurement illustrated in FIG. 19 described above may be executed.

Next, at step S410, the laser controller 30 may so adjust the charging voltage Vhv as to bring the difference ΔE close to zero. More specifically, the sub-routine of adjusting the charging voltage Vhv illustrated in FIG. 20 described above may be executed.

Next, at step S412, the laser controller 30 may measure the pulse energy of the pulsed laser beam again with use of the light sensor 17c of the pulse energy measurement section 17. More specifically, the sub-routine of the pulse energy measurement illustrated in FIG. 19 described above may be executed.

Next, at step S414, the laser controller 30 may determine whether or not the absolute value of the difference ΔE is equal to or smaller than the tolerance ΔEmax. In other words, the laser controller 30 may perform determination based on whether an expression of |ΔE|≤ΔEmax is satisfied. When the expression of |ΔE|≤ΔEmax is satisfied, the process may proceed to step S416. When the expression of |ΔE|≤ΔEmax is not satisfied, the process may proceed to step S410.

Next, at step S416, the laser controller 30 may open the emission port shutter 50. More specifically, the laser controller 30 may inform the exposure apparatus controller 110 of completion of the electrode gap adjustment and the charging voltage adjustment in the laser apparatus, and open the emission port shutter 50 to allow the pulsed laser beam to enter the exposure apparatus. Note that when the emission port shutter 50 has been already opened, the step may be skipped. In this case, for example, the laser controller 30 may transmit a signal to open the emission port shutter 50; but the operation to open the emission port shutter 50 is not performed because the emission port shutter 50 has been already opened.

Next, at step S418, the laser controller 30 may determine whether the target frequency ft of the pulsed laser beam has been changed in the exposure apparatus 100. More specifically, the laser controller 30 may perform determination based on whether the laser controller 30 has received, from the exposure apparatus controller 110, information indicating that the target frequency ft of the pulsed laser beam has been changed. When the target frequency ft of the pulsed laser beam has been changed in the exposure apparatus 100, the process may proceed to step S402. When the target frequency ft of the pulsed laser beam has not been changed in the exposure apparatus 100, the process may proceed to step S410.

Figure 26:
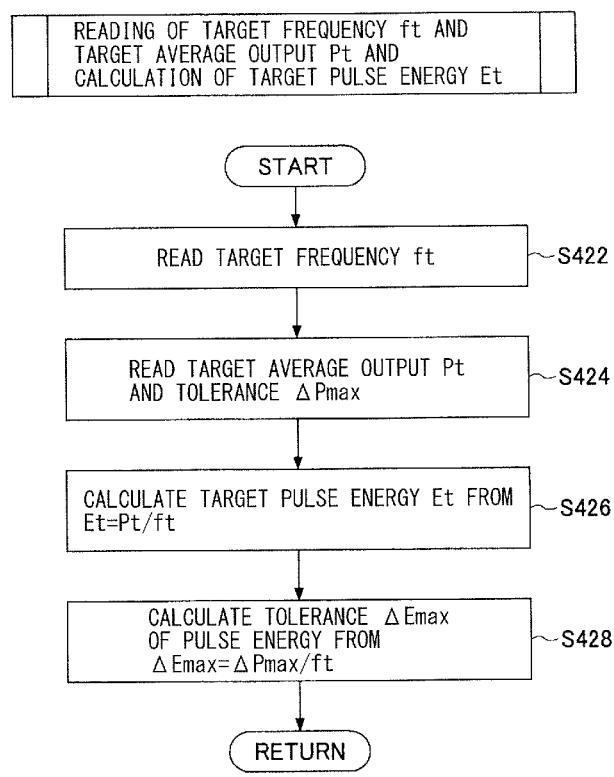
FIG. 26 is a flowchart (2) of the method of controlling the frequency of the pulsed laser light by the electrode gap varying section.

The sub-routine of reading the target frequency ft and the target average output Pt and calculating the target pulse energy Et executed at step S404 mentioned above is described with reference to FIG. 26.

First, at step S422, the laser controller 30 may read the target frequency ft of the pulsed laser beam from the exposure apparatus controller 110.

Next, at step S424, the laser controller 30 may read, from the exposure apparatus controller 110, the target average output Pt of the pulsed laser beam and the tolerance ΔPmax of the difference between an average output of the pulsed laser beam and the target average output Pt.

Next, at step S426, the laser controller 30 may calculate the target pulse energy Et of the pulsed laser beam. More specifically, the laser controller 30 may calculate the target pulse energy Et from an expression of Et=Pt/ft.

Next, at step S428, the laser controller 30 may calculate the tolerance ΔEmax of the difference between the pulse energy of the pulsed laser beam and the target pulse energy of the pulsed laser beam. More specifically, the laser controller 30 may calculate the tolerance ΔEmax of the difference between the pulse energy of the pulsed laser beam and the target pulse energy from an expression of ΔEmax=ΔPmax/ft. Thereafter, the process may return to the main routine illustrated in FIG. 25.

Figure 27:
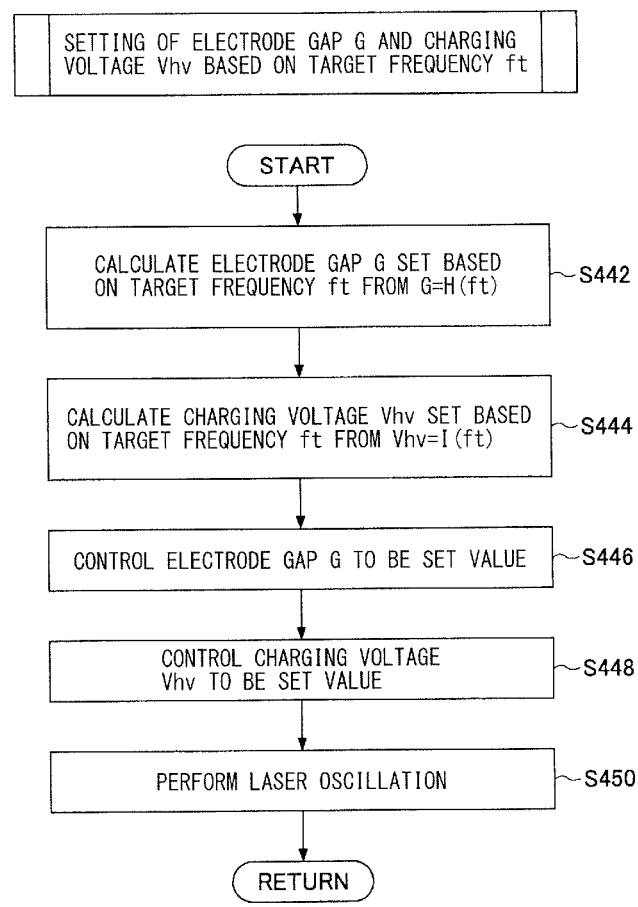
FIG. 27 is a flowchart (3) of the method of controlling the frequency of the pulsed laser light by the electrode gap varying section.

The sub-routine of setting the electrode gap G and the charging voltage Vhv based on the target frequency ft that is executed at step S406 mentioned above is described with reference to FIG. 27.

First, at step S442, the laser controller 30 may calculate the value of the electrode gap G to be set based on the target frequency ft of the pulsed laser beam. More specifically, the laser controller 30 may calculate the value of the electrode gap G to be set based on the function of G=H(ft).

Next, at step S444, the laser controller 30 may calculate the value of the charging voltage Vhv to be set based on the target frequency ft of the pulsed laser beam. More specifically, the laser controller 30 may calculate the value of the charging voltage Vhv to be set based on the function of Vhv=I(ft).

Next, at step S446, the laser controller 30 may control the electrode gap G to be the set value. More specifically, the laser controller 30 may transmit the set value of the electrode gap G to the driver 22 of the electrode gap varying section 20, and move the first discharge electrode 11a with use of the electrode moving mechanisms 21. This may adjust the electrode gap G that is the gap between the first discharge electrode 11a and the second discharge electrode 11b to the set value.

Next, at step S448, the laser controller 30 may control the charging voltage Vhv in the charger 12 to the set value.

Next, at step S450, the laser controller 30 may allow the laser apparatus to perform laser oscillation. Thereafter, the process may return to the main routine illustrated in FIG. 25.

[6. Electrode Gap Adjustment in Double Chamber Excimer Laser Apparatus]

[6.1 Configuration]

Figure 28:
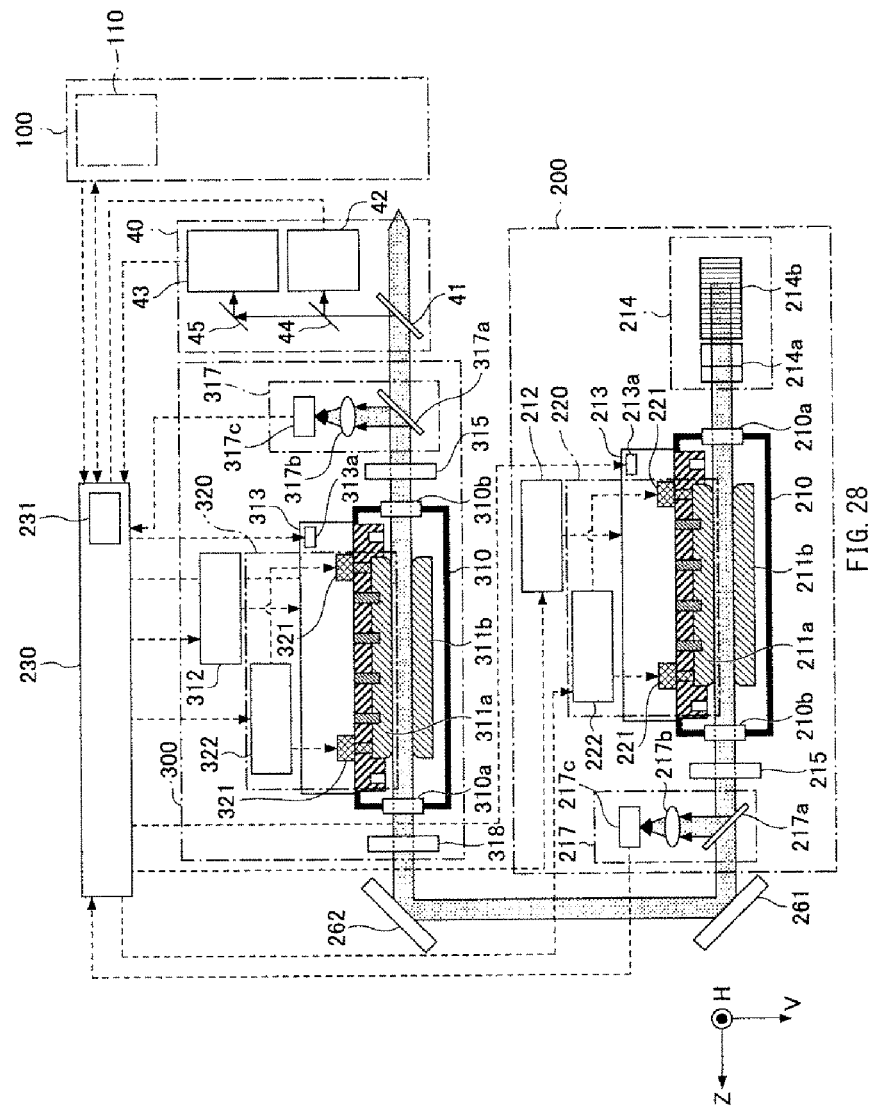
FIG. 28 is a configuration diagram of a double chamber excimer laser apparatus.

A double chamber excimer laser apparatus is described. As illustrated in FIG. 28, the double chamber excimer laser apparatus may include an MO 200, a PO 300, a laser controller 230, high reflection mirrors 261 and 262, and the laser beam measurement section 40. MO is an abbreviation of master oscillator, and PO is an abbreviation of power oscillator. Note that the laser controller 230 may include a memory 231.

The MO 200 may include a configuration partially similar to that of the laser apparatus illustrated in FIG. 1. More specifically, the MO 200 may include an MO laser chamber 210, an MO charger 212, an MO pulse power module 213, a laser resonator, and an MO pulse energy measurement section 217.

The MO laser chamber 210 may include a pair of discharge electrodes 211a and 211b and two windows 210a and 210b through which the laser beam passes.

An MO electrode gap varying section 220 may be disposed on the MO laser chamber 210. The MO electrode gap varying section 220 may include a plurality of MO electrode moving mechanisms 221 and an MO driver 222. The plurality of MO electrode moving mechanisms 221 may vary a gap between the discharge electrodes 211a and 211b, and the MO driver 222 may drive the MO electrode moving mechanisms 221. Each of the MO electrode moving mechanisms 221 may be configured of, for example, an actuator, and two or three or more MO electrode moving mechanisms 221 may be provided.

The laser resonator may include a line narrowing module 214 and an MO output coupler 215. The MO laser chamber 210 may be disposed in an optical path of the laser resonator.

The line narrowing module 214 may include a prism 214a and a grating 214b. The prism 214a may expand a width of the beam. The grating 214b may be disposed in Littrow arrangement, and the laser apparatus may oscillate at a target wavelength.

The MO output coupler 215 may be a partial reflection mirror that reflects a part of the laser beam and allow the other part of the laser beam to pass therethrough.

The MO pulse energy measurement section 217 may include a beam splitter 217a, a light condensing lens 217b, and a light sensor 217c that are disposed in an optical path of the laser beam that has passed through the MO output coupler 215.

The MO pulse power module 213 may include an unillustrated capacitor, be coupled to the discharge electrodes 211a and 211b, and further include a switch 213a. Electric discharge may occur between the discharge electrodes 211a and 211b in response to input of a trigger signal to the switch 213a. The MO charger 212 may be coupled to the capacitor provided in the MO pulse power module 213.

The PO 300 may include a PO laser chamber 310, a PO charger 312, a PO pulse power module 313, a laser resonator, and a PO pulse energy measurement section 317.

The PO laser chamber 310 may include a pair of discharge electrodes 311a and 311b, and two windows 310a and 310b through which the laser beam passes.

A PO electrode gap varying section 320 may be disposed on the PO laser chamber 310. The PO electrode gap varying section 320 may include a plurality of PO electrode moving mechanisms 321 and a PO driver 322. The plurality of PO electrode moving mechanisms 321 may vary a gap between the discharge electrodes 311a and 311b, and the PO driver 322 may drive the PO electrode moving mechanisms 321. Each of the PO electrode moving mechanisms 321 may be configured of, for example, an actuator, and two or three or more PO electrode moving mechanisms 321 may be provided.

The laser resonator may include a partial reflection mirror 318 and a PO output coupler 315. The PO laser chamber 310 may be disposed in an optical path of the laser resonator.

The PO output coupler 315 may be a partial reflection mirror that reflects a part of the laser beam and allows the other part of the laser beam to pass therethrough.

The PO pulse energy measurement section 317 may include a beam splitter 317a, a light condensing lens 317b, and a light sensor 317c that are disposed in an optical path of the laser beam that has passed through the PO output coupler 315.

The PO pulse power module 313 may include an unillustrated capacitor, be coupled to the discharge electrodes 311a and 311b, and further include a switch 313a. Electric discharge may occur between the discharge electrodes 311a and 311b in response to input of a trigger signal to the switch 313a. The PO charger 312 may be coupled to the capacitor provided in the PO pulse power module 313.

[6.2 Beam Parameter Control]

[6.2.1 Operation]

The laser controller 230 may receive, from the exposure apparatus controller 110, the target beam parameter Bt (such as the target beam size and the target beam divergence) and the tolerance ΔBmax of the difference between the beam parameter and the target beam parameter Bt.

The laser controller 230 may set a charging voltage Vhvmo to the MO charger 212, and set a charging voltage Vhvpo to the PO charger 312.

The pulsed laser beam with narrowed spectral line width that has been outputted from the MO 200 may be reflected by the high reflection mirrors 261 and 262, and the reflected pulsed laser beam may enter the PO 300. When the pulsed laser beam that has entered the PO 300 passes through the partial reflection mirror 318 and then enters the discharge region of the PO laser chamber 310, electric discharge may be generated between the discharge electrodes 311a and 311b that are disposed inside the PO laser chamber 310. Therefore, the laser controller 230 may transmit corresponding trigger signals, at predetermined respective timings, to the switch 213a of the MO pulse power module 213 and the switch 313a of the PO pulse power module 313.

In the MO 200, when the switch 213a of the MO pulse poser module 213 receives the trigger signal from the laser controller 230, electric discharge may occur between the discharge electrodes 211a and 211b inside the MO laser chamber 210, in synchronization with the trigger signal.

When the electric discharge occurs in the excimer laser gas in the MO laser chamber 210, the excimer laser gas may be excited, which may result in laser oscillation between the line narrowing module 214 and the MO output coupler 215. As a result, the pulsed laser beam with narrowed spectral line width may be outputted from the MO output coupler 215. The pulse energy of the pulsed laser beam may be detected by the MO pulse energy measurement section 217, and the detected value of the pulse energy may be transmitted to the laser controller 230 and be converted into pulse energy Emo.

The pulsed laser (seed) beam with narrowed spectral line width that has been outputted from the MO 200 may be reflected by the high reflection mirrors 261 and 262, and the reflected pulsed laser (seed) beam may enter the PO 300.

A part of the pulsed laser (seed) beam that has entered the PO 300 may pass through the partial reflection mirror 318, and then pass through the discharge region inside the PO laser chamber 310. At timing when the pulsed laser (seed) beam passes through the discharge region inside the PO laser chamber 310, electric discharge may be generated between the discharge electrodes 311a and 311b inside the PO laser chamber 310 to excite the excimer laser gas. As a result, the pulsed laser beam may be amplified by the laser resonator that is configured of the partial reflection mirror 318 and the PO output coupler 315. The pulse energy of the pulsed laser beam outputted from the PO output coupler 315 may be detected by the PO pulse energy measurement section 317, and the detected value of the pulse energy may be transmitted to the laser controller 230 and converted into pulse energy Epo.

The laser beam measurement section 40 may measure the beam parameter B (such as the beam size and the beam divergence) of the pulsed laser beam that has passed through the beam splitter 317a of the PO pulse energy measurement section 317.

The MO electrode gap varying section 220 and the PO electrode gap varying section 320 may be so controlled as to bring the difference ΔB between the measured value of the beam parameter B and the target beam parameter Bt (such as the target beam size and the target beam divergence) close to zero.

[6.2.2 Action]

Since the MO electrode gap varying section 220 and the PO electrode gap varying section 320 are so controlled as to bring the difference ΔB between the measured value of the beam parameter B and the target beam parameter Bt close to zero, it is possible to bring the beam parameter B close to the target beam parameter Bt.

Note that, in FIG. 28, a case where the PO is used as the amplifier has been described; however, the amplifier is not limited thereto. A power amplifier (PA) not including an optical resonator may be used in place of the PO.

[6.2.3 Method of Controlling Beam Parameter]

To control the beam parameter of the pulsed laser beam, although either of the MO electrode gap varying section 220 and the PO electrode gap varying section 320 may be driven, it is more preferable to drive both of them.

[6.3 Pulse Energy Control]
[6.3.1 Operation]

The laser controller 230 may receive, from the exposure apparatus controller 110, the target pulse energy Et and the tolerance ΔEmax of the difference between the pulse energy and the target pulse energy Et.

The laser controller 230 may so control the PO electrode gap varying section 320 as to allow the electrode gap of the PO 300 that is set corresponding to the target pulse energy Et, to be the predetermined electrode gap.

The laser controller 230 may charge the PO charger 312 with the charging voltage Vhvpo that is set corresponding to the target pulse energy Et.

The electrode gap between the discharge electrodes 211a and 211b in the MO 200 may be a fixed value, and the charging voltage Vmo of the charger 212 may also be a fixed value, irrespective of the target pulse energy Et.

The pulsed laser beam with narrowed spectral line width that has been outputted from the MO 200 may be reflected by the high reflection mirrors 261 and 262, and the reflected pulsed laser beam may enter the PO 300. Electric discharge may be generated between the discharge electrodes 311a and 311b disposed inside the PO laser chamber 310 when the pulsed laser beam that has entered the PO 300 passes through the partial reflection mirror 318 and then enters the discharge region of the PO laser chamber 310. Accordingly, the laser controller 230 may transmit corresponding trigger signals, at predetermined respective timings, to the switch 213a of the MO pulse power module 213 and the switch 313a of the PO pulse power module 313.

In the MO 200, when the switch 213a of the MO pulse power module 213 receives the trigger signal from the laser controller 230, electric discharge may occur between the discharge electrodes 211a and 211b inside the MO laser chamber 210, in synchronization with the trigger signal.

When the electric discharge occurs in the excimer laser gas inside the MO laser chamber 210, the excimer laser gas may be excited, which may result in laser oscillation between the line narrowing module 214 and the MO output coupler 215. As a result, the pulsed laser beam, the spectral line width of which has been narrowed, may be outputted from the MO output coupler 215. The pulse energy of the pulsed laser beam may be detected by the MO pulse energy measurement section 217, and the detected value may be transmitted to the laser controller 230 and be converted into pulse energy Emo.

The pulsed laser (seed) beam that has been outputted from the MO 200 and the spectral line width of which has been narrowed, may be reflected by the high reflection mirrors 261 and 262, and the reflected pulsed laser (seed) beam may enter the PO 300.

A part of the pulsed laser (seed) beam that has entered the PO 300 may pass through the partial reflection mirror 318, and then pass through the discharge region inside the PO laser chamber 310. At timing when the pulsed laser (seed) beam passes through the discharge region inside the PO laser chamber 310, electric discharge may be generated between the discharge electrodes 311a and 311b inside the PO laser chamber 310 to excite the excimer laser gas. As a result, the pulsed laser beam may be amplified by the laser resonator that is configured of the partial reflection mirror 318 and the PO output coupler 315. The pulse energy of the pulsed laser beam outputted from the PO output coupler 315 may be detected by the PO pulse energy measurement section 317, and the detected value of the pulse energy may be transmitted to the laser controller 230 and converted into pulse energy Epo.

The laser controller 230 may calculate the difference ΔE (=Epo−Et) between the pulse energy Epo and the target pulse energy Et.

The laser controller 230 may so control the charging voltage Vhvpo to be applied to the PO charger 312 of the PO 300 as to bring the difference ΔE between the pulse energy Epo and the target pulse energy Et close to zero. In the case of the double chamber excimer laser apparatus, in the flowcharts illustrated in FIG. 25 to FIG. 27, the control may be performed by replacing the electrode gap G between the discharge electrodes 11a and 11b with the electrode gap between the discharge electrodes 311a and 311b and replacing the charging voltage Vhv with the charging voltage of the PO charger 312.

[6.3.2 Action]

The laser apparatus according to the embodiment of the disclosure may adjust the electrode gap G with use of the PO electrode gap varying section 320 based on the target pulse energy Et. As a result, it is possible to largely vary the pulse energy Epo outputted from the PO 300 in a short time, as compared with the case where the pressure of the laser gas of the PO 300 is varied.

Note that, in FIG. 28, the case where the PO is used as the amplifier has been described; however, the amplifier is not limited thereto. Alternatively, a PA not including an optical resonator may be used in place of the PO.

[6.3.3 Method of Controlling Pulse Energy]

To control the pulse energy of the pulsed laser beam, although both of the MO electrode gap varying section 220 and the PO electrode gap varying section 320 may be driven, only the PO electrode gap varying section 320 may be driven.

[7. Others]

[7.1 Modification of Electrode Gap Varying Section]

Figures 29A, 29B:
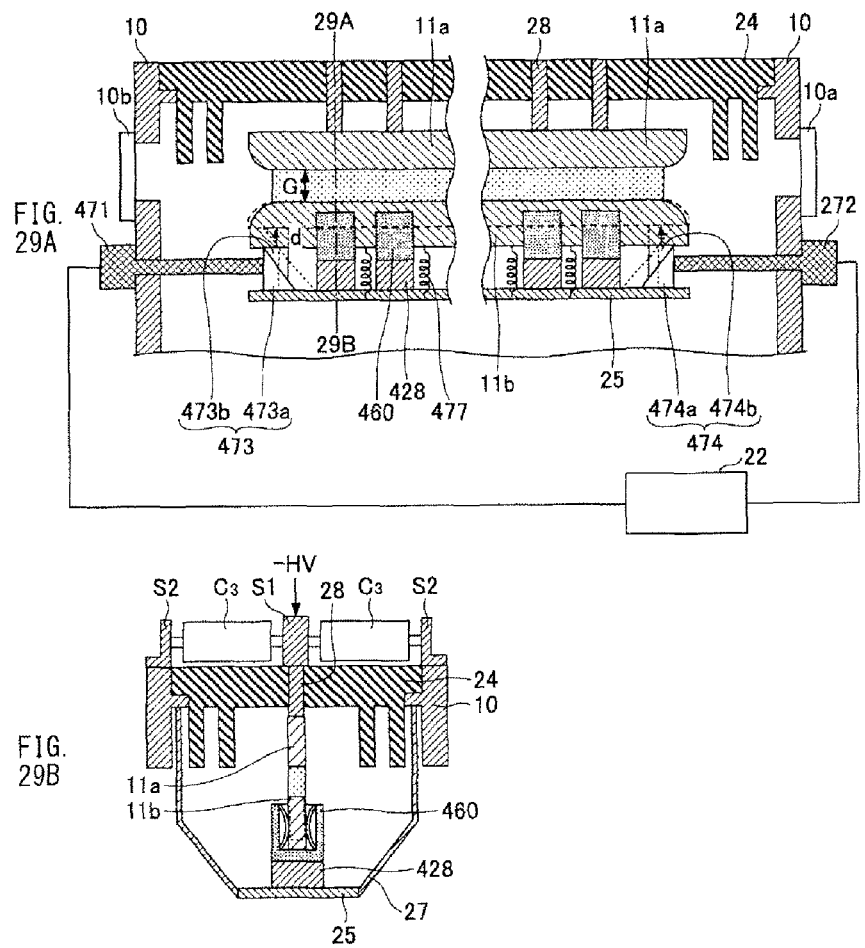
FIG. 29A is an explanatory diagram of another electrode gap varying section used in the laser apparatus according to an embodiment of the disclosure.
FIG. 29B is a sectional diagram of the electrode gap varying section used in the laser apparatus according to the embodiment of the disclosure.

The electrode gap varying section may move the second discharge electrode 11b. Specifically, as illustrated in FIGS. 29A and 29B, the electrode gap varying section may move the second discharge electrode 11b to side where the first discharge electrode 11a is provided inside the laser chamber 10. Note that FIG. 29A is a sectional diagram of the laser chamber 10 on a plane parallel to the optical path of the pulsed laser beam, and FIG. 29B is a sectional diagram of the laser chamber 10 cut along an alternate long and short dash line 29A-29B in FIG. 29A.

More specifically, the second discharge electrode 11b may be electrically coupled to a current induction terminal 428 through a connector 460. Electrode moving mechanisms 471 and 472 that are coupled to the driver 22 may be provided. A front end of the electrode moving mechanism 471 may be provided with a slide part 473, and a front end of the electrode moving mechanism 472 may be provided with a slide part 474. The slide part 473 may be formed of a first block 473a and a second block 473b, and the slide part 474 may be formed of a first block 474a and a second block 474b. Driving the electrode moving mechanisms 471 and 472 may push the first blocks 473a and 474a inside, which may raise the second blocks 473b and 474b, respectively. By the rising of the second blocks 473b and 474b, the second discharge electrode 11b may be pushed by the second blocks 473b and 474b and move toward the first discharge electrode 11a. The second discharge electrode 11b may be provided with a spring 477, force of which works in a direction apart from the first discharge electrode 11a. Note that the first discharge electrode 11a may be coupled directly to the current induction terminal 28.

[7.2 Power Supply Circuit of Excimer Laser Beam Source]

Figure 30:
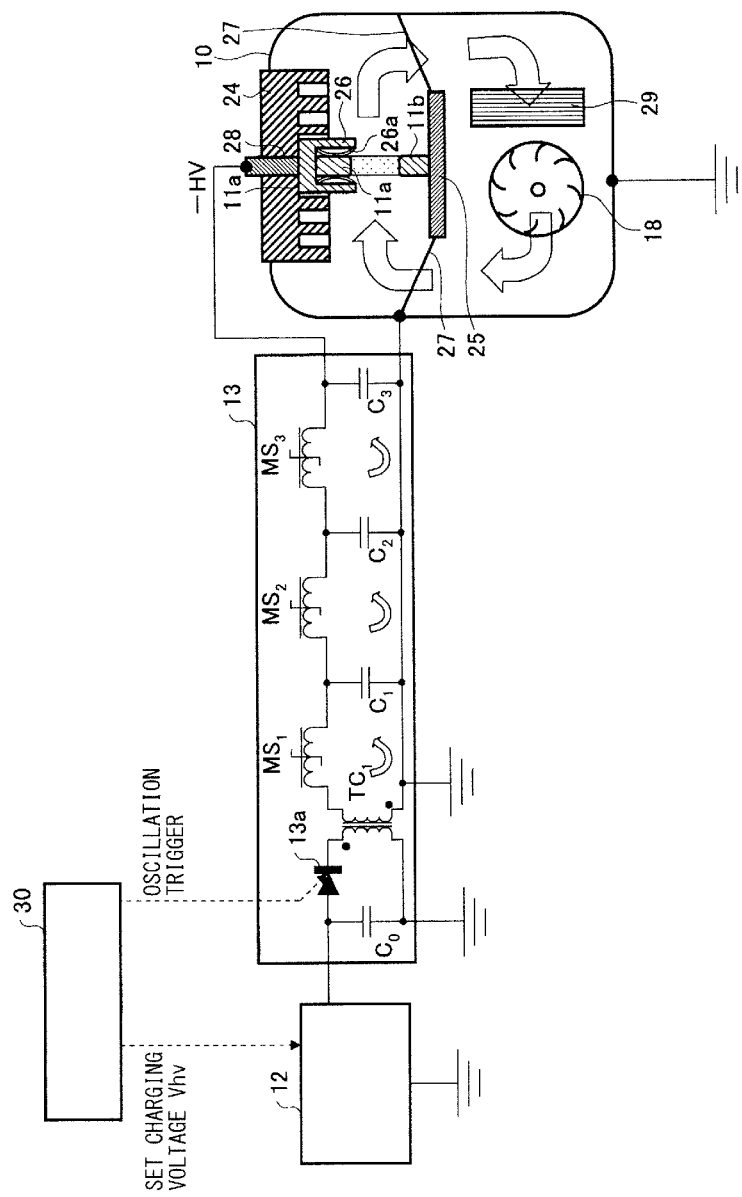
FIG. 30 is an explanatory diagram of a pulse power module and a charger.

The pulse power module 13 and the charger 12 in the excimer laser beam source are described with reference to FIG. 30. FIG. 30 illustrates an electric circuit including the pulse power module 13, the charger 12, and other components. Note that a heat exchanger 29 may be provided inside the laser chamber 10 of the excimer laser beam source. The first discharge electrode 11a of the pair of the discharge electrodes may be coupled to the pulse power module 13 through the connector 26 and the current induction terminal 28, and the second discharge electrode 11b may be grounded.

The pulse power module 13 may include a semiconductor switch serving as the switch 13a, magnetic switches $MS_1$, $MS_2$, and $MS_3$, a capacitor $C_0$, capacitors $C_1$, $C_2$, and $C_3$, and a transformer $TC_1$. When the time-integrated value of the voltage applied to the magnetic switch reaches a threshold value, the current may easily flow through the magnetic switch. In the following description, when the current easily flows through the magnetic switch, the magnetic switch is closed. Thus, before the time-integrated value of the voltage applied to the magnetic switch reaches the threshold value, the magnetic switch may be opened. The threshold value may be different for each magnetic switch.

The switch 13a may be provided between the capacitor $C_0$ and the transformer $TC_1$. The magnetic switch $MS_1$ may be provided between the transformer $TC_1$ and the capacitor $C_1$. The magnetic switch $MS_2$ may be provided between the capacitor $C_1$ and the capacitor $C_2$. The magnetic switch $MS_3$ may be provided between the capacitor $C_2$ and the capacitor $C_3$.

The laser controller 30 may set, to the charger 12, an instructed value of the voltage Vhv at the time when electric charges are charged to the capacitor $C_0$. Based on the instructed value, the charger 12 may so charge the capacitor $C_0$ with the electric charges as to allow the voltage to be applied to the capacitor $C_0$ to be Vhv.

When the signal is transmitted from the laser controller 30 to the switch 13a, the switch 13a may be closed, and the current may flow from the capacitor $C_0$ to the transformer $TC_1$.

Then, the magnetic switch $MS_1$ may be closed, the current may flow from the transformer $TC_1$ to the capacitor $C_1$, and the capacitor $C_1$ may be accordingly charged with the electric charges. At this time, the pulse width of the current may become short and the capacitor $C_1$ may be charged with the electric charges.

Then, the magnetic switch $MS_2$ may be closed, the current may flow from the capacitor $C_1$ to the capacitor $C_2$, and the capacitor $C_2$ may be accordingly charged with the electric charges. At this time, the pulse width of the current may become shorter and the capacitor $C_2$ may be charged with the electric charges.

Then, the magnetic switch $MS_3$ may be closed, the current may flow from the capacitor $C_2$ to the capacitor $C_3$, and the capacitor $C_3$ may be accordingly charged with the electric charges. At this time, the pulse width of the current may become shorter and the capacitor $C_3$ may be charged with the electric charges.

The current sequentially flows from the transformer $TC_1$ to the capacitor $C_1$, from the capacitor $C_1$ to the capacitor $C_2$, and from the capacitor $C_2$ to the capacitor $C_3$ in this way, and accordingly the capacitor $C_3$ may be charged with the electric charges while the pulse width of the current may be gradually decreased.

Thereafter, the voltage may be applied, from the capacitor $C_3$, between the first discharge electrode 11a and the second discharge electrode 11b provided inside the laser chamber 10, which may cause electric discharge in the excimer laser gas in the clearance between the first discharge electrode 11a and the second discharge electrode 11b.

Here, energy Ein supplied between the discharge electrodes 11a and 11b may be nearly proportional to accumulated energy that is determined by the charging voltage Vhv applied to the capacitor $C_0$ and a capacitance $C_{0C}$ of the capacitor $C_0$. In other words, the energy Ein supplied between the discharge electrodes 11a and 11b may be represented by an expression of $Ein = k_3 \times C_{0C} \times (Vhv)^2 / 2$.

Note that $k_3$ may be a proportional constant, which may be determined by experiments or a circuit constant.

The electric insulator 24 may be provided with the first discharge electrode 11a which may be coupled to an output of –HV of the pulse power module 13 through the current induction terminal 28. The electric insulator 24 may be formed of high-grade alumina ceramics.

The second discharge electrode 11b may be disposed on the electrode holder 25, and be disposed to face the first discharge electrode 11a. The first discharge electrode 11a and the second discharge electrode 11b may be each formed of a metal containing Cu.

The electrode holder 25 may be formed of a metal (a metal containing Al or Cu). The electrode holder 25 may be coupled to the laser chamber 10 through the wirings 27. A terminal on ground side of the pulse power module 13 may be coupled to the laser chamber 10. The laser chamber 10 may be grounded. The wirings 27 may be disposed at a fixed distance in a longitudinal direction of the pair of discharge electrodes 11a and 11b.

The laser gas in the laser chamber 10 may be circulated in an arrow direction by rotation of the cross flow fan 18. The laser gas may flow through a clearance between the wirings 27, and flow in the clearance between the first discharge electrode 11a and the second discharge electrode 11b. When the electric discharge occurs between the first discharge electrode 11a and the second discharge electrode 11b, a discharge product may be carried by the circulating laser gas. Thereafter, the laser gas may be cooled by passing through the heat exchanger 29. Then, the laser gas may be circulated again by the cross flow fan 18.

[7.3 Controller]

Figure 31:
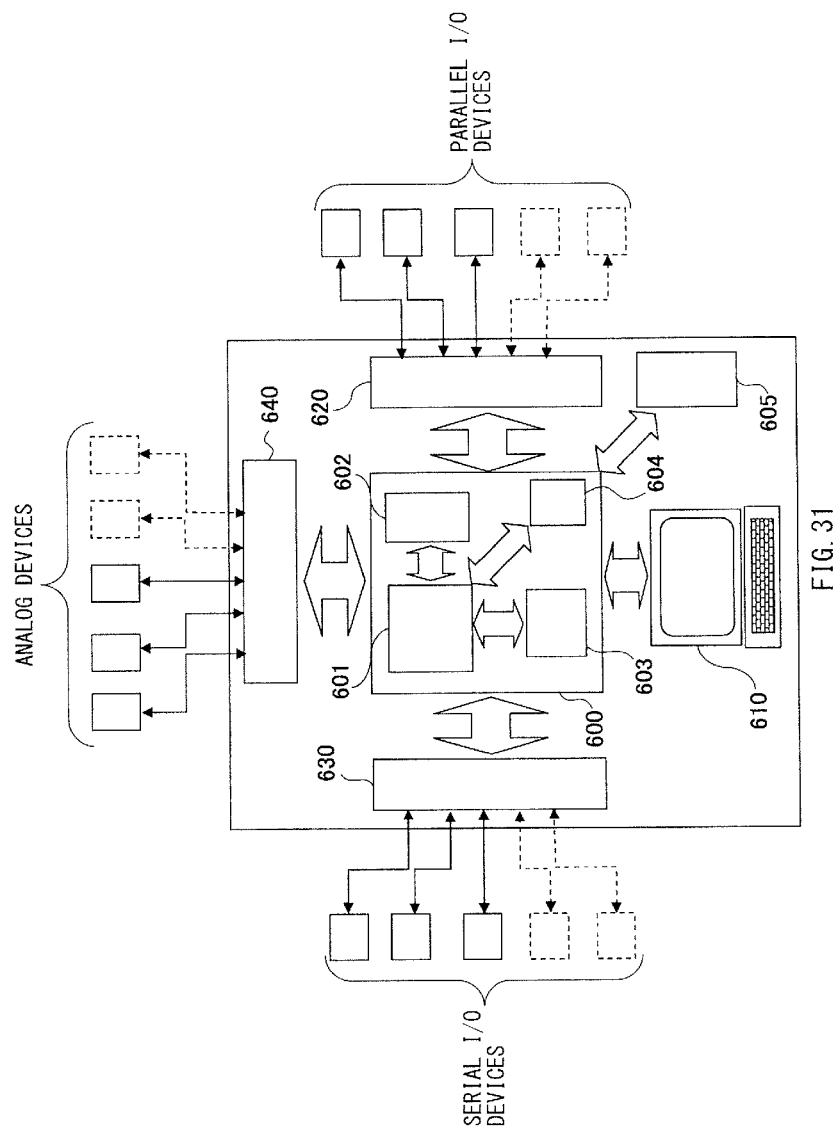
FIG. 31 is an explanatory diagram of a controller.

The controllers such as the laser controller 30 and the laser controller 230 are described with reference to FIG. 31.

The controllers such as the laser controller 30 each may be configured of a general-purpose control device such as a computer and a programmable controller. For example, the controllers may be each configured as follows.

The controller may include a processing section 600, a storage memory 605, a user interface 610, a parallel input/output (I/O) controller 620, a serial I/O controller 630, and an analog-to-digital (A/D) and digital-to-analog (D/A) converter 640. The storage memory 605, the user interface 610, the parallel I/O controller 620, the serial I/O controller 630, and the A/D and D/A converter 640 may be coupled to the processing section 600. The processing section 600 may include a central processing unit (CPU) 601, a memory 602, a timer 603, and a graphics processing unit (GPU) 604. The memory 602, the timer 603, and the GPU 604 may be coupled to the CPU 601.

The processing section 600 may load programs stored in the storage memory 605. The processing section 600 may execute the loaded programs, read data from the storage memory 605 according to the execution of the programs, or write data in the storage memory 605.

The parallel I/O controller 620 may be coupled to devices operable to perform communication through parallel I/O ports. The parallel I/O controller 620 may control the communication using digital signals, that is performed through the parallel I/O ports in execution of the programs by the processing section 600.

The serial I/O controller 630 may be coupled to devices operable to perform communication through serial I/O ports. The serial I/O controller 630 may control the communication using digital signals, that is performed through the serial I/O ports in execution of the programs by the processing section 600.

The A/D and D/A converter 640 may be coupled to devices operable to perform communication through analog ports. The A/D and D/A converter 640 may control the communication using analog signals, that is performed through the analog ports in execution of the programs by the processing section 600.

The user interface 610 may be configured to provide an operator with display showing a progress of the execution of the programs executed by the processing section 600 or be able to instruct the processing section 600 to stop execution of the programs or to execute an interruption routine.

The CPU 601 of the processing section 600 may perform arithmetic processing of the programs. The memory 602 may temporarily hold the programs in execution of the programs by the CPU 601 or temporarily hold the data in the arithmetic processing. The timer 603 may measure time and elapsed time, and provide the time and the elapsed time to the CPU 601 according to the execution of the programs. The GPU 604 may process image data according to the execution of the programs when the image data is inputted to the processing section 600, and provide a result of the processing to the CPU 601.

Non-limiting examples of the devices operable to perform communication through the parallel I/O/port coupled to the parallel I/O controller 620 may include the charger 12, the laser beam measurement section, the driver 22, and any other controller.

The devices operable to perform communication through the serial I/O port coupled to the serial I/O controller 630 may be, for example, any other controller.

The devices operable to perform communication through the analog ports coupled to the A/D and D/A converter 640 may be various kinds of sensors in, for example, the pulse energy measurement section 17.

The foregoing description is intended to be merely illustrative rather than limiting. It should therefore be appreciated that variations may be made in example embodiments of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items. Also, the singular forms "a", "an", and "the" used in the specification and the appended claims include plural references unless expressly and unequivocally limited to one referent.

What is claimed is:

1. A laser apparatus comprising:
an optical resonator including an output coupler;
a laser chamber containing a laser medium and disposed in an optical path inside the optical resonator;
a pair of discharge electrodes disposed inside the laser chamber;
an electrode gap varying section configured to vary a gap between the discharge electrodes;
a laser beam measurement section disposed in an optical path of a laser beam outputted from the output coupler, the laser beam resulting from electric discharge between the discharge electrodes; and
a controller configured to control the gap between the discharge electrodes through activating the electrode gap varying section, based on a beam parameter of the laser beam measured by the laser beam measurement section.

2. The laser apparatus according to claim 1, wherein the beam parameter is a beam size of the laser beam.

3. The laser apparatus according to claim 1, wherein the beam parameter is beam divergence of the laser beam.

4. A laser apparatus comprising:
an optical resonator including an output coupler;
a laser chamber containing a laser medium and disposed in an optical path inside the optical resonator;
a pair of discharge electrodes disposed inside the laser chamber;
an electrode gap varying section configured to vary a gap between the discharge electrodes;
a pulse energy measurement section disposed in an optical path of a laser beam outputted from the output coupler, the laser beam resulting from electric discharge between the discharge electrodes; and
a controller configured to control the gap between the discharge electrodes through activating the electrode gap varying section, based on a value measured by the pulse energy measurement section.

5. The laser apparatus according to claim 4, further comprising a charger configured to cause electric discharge between the discharge electrodes, wherein
the controller controls a charging voltage of the charger, based on the value measured by the pulse energy measurement section.

6. A laser apparatus comprising:
an optical resonator including an output coupler;
a laser chamber containing a laser medium and disposed in an optical path inside the optical resonator;
a pair of discharge electrodes disposed inside the laser chamber;
an electrode gap varying section configured to vary a gap between the discharge electrodes; and
a controller configured to control the gap between the discharge electrodes through activating the electrode gap varying section to allow a frequency of a pulsed laser beam outputted from the output coupler to be a predetermined frequency, the pulsed laser beam resulting from electric discharge between the discharge electrodes.

7. The laser apparatus according to claim 6, further comprising:
a pulse energy measurement section disposed in an optical path of the pulsed laser beam; and
a charger configured to cause electric discharge between the discharge electrodes, wherein
the controller controls a charging voltage of the charger, based on a value measured by the pulse energy measurement section.

* * * * *